(12) United States Patent
Xu et al.

(10) Patent No.: US 12,191,989 B2
(45) Date of Patent: Jan. 7, 2025

(54) TRANSMISSION MODE SELECTION METHOD AND DEVICE

(71) Applicant: Huawei Technologies Co., Ltd., Shenzhen (CN)

(72) Inventors: Bin Xu, Beijing (CN); Zhenzhen Cao, Beijing (CN); Bingzhao Li, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 47 days.

(21) Appl. No.: 17/366,938

(22) Filed: Jul. 2, 2021

(65) Prior Publication Data

US 2021/0336717 A1  Oct. 28, 2021

Related U.S. Application Data

(63) Continuation of application No. PCT/CN2019/129299, filed on Dec. 27, 2019.

(30) Foreign Application Priority Data

Jan. 3, 2019 (CN) .......................... 201910005020.0

(51) Int. Cl.
*H04L 1/00* (2006.01)
*H04L 1/08* (2006.01)
(Continued)

(52) U.S. Cl.
CPC .............. *H04L 1/0006* (2013.01); *H04L 1/08* (2013.01); *H04L 1/1812* (2013.01); *H04L 1/189* (2013.01)

(58) Field of Classification Search
CPC ....... H04L 1/0006; H04L 1/0017; H04L 1/08; H04L 1/1812; H04L 1/1825; H04L 1/189; H04L 1/1896; H04W 76/15
See application file for complete search history.

(56) References Cited

U.S. PATENT DOCUMENTS 8,705,475 B2   4/2014 Moon et al.
2018/0279168 A1  9/2018 Jheng et al.
(Continued)

FOREIGN PATENT DOCUMENTS

CN   105578513 A   5/2016
CN   107733577 A   2/2018
(Continued)

OTHER PUBLICATIONS

"Configuration and activation/deactivation of duplication," 3GPP TSG-RAN WG2 Meeting #98, R2-1704247, Hangzhou, China, Total 2 pages, 3rd Generation Partnership Project, Valbonne, France (May 15-19, 2017).

(Continued)

*Primary Examiner* — Gary Mui
(74) *Attorney, Agent, or Firm* — Leydig, Voit & Mayer, Ltd.

(57) ABSTRACT

A transmission mode selection method and a device are provided. The method includes: determining first indication information, where the first indication information is used to indicate a changed transmission mode and/or indicate to change a transmission mode; and sending the first indication information to a terminal device. There may be a plurality of transmission modes for transmitting a data packet duplicated at a PDCP layer, in other words, there may be a plurality of modes for PDCP duplication. A transmission mode can be selected by using the first indication information. For example, when reliability of a mode for PDCP duplication is not high, another transmission mode can be selected by using the first indication information. In this way, a reliability requirement of a service is met as much as possible, thereby improving transmission quality of the service.

17 Claims, 7 Drawing Sheets

(51) Int. Cl.
  *H04L 1/1812* (2023.01)
  *H04L 1/1867* (2023.01)

(56) References Cited

U.S. PATENT DOCUMENTS

| | | | |
|---|---|---|---|
| 2018/0310202 A1* | 10/2018 | Löhr | H04L 1/1874 |
| 2018/0368200 A1 | 12/2018 | Jin et al. | |
| 2019/0098640 A1* | 3/2019 | Holakouei | H04W 72/542 |
| 2020/0015317 A1* | 1/2020 | Tang | H04L 1/0026 |
| 2020/0052826 A1 | 2/2020 | Han et al. | |
| 2020/0092870 A1* | 3/2020 | Tang | H04W 76/15 |
| 2020/0100235 A1* | 3/2020 | Jo | H04W 80/02 |
| 2020/0163140 A1* | 5/2020 | Mochizuki | H04L 5/0098 |
| 2020/0228442 A1* | 7/2020 | Liu | H04L 1/08 |
| 2020/0267793 A1* | 8/2020 | Sharma | H04W 28/02 |
| 2021/0022040 A1* | 1/2021 | Zhu | H04W 80/02 |
| 2021/0243538 A1* | 8/2021 | Henriksen | H04R 1/1025 |
| 2021/0385017 A1* | 12/2021 | Kuo | H04L 1/08 |
| 2023/0217296 A1* | 7/2023 | Bae | H04W 76/20 370/329 |

FOREIGN PATENT DOCUMENTS

| | | |
|---|---|---|
| CN | 107852267 A | 3/2018 |
| CN | 108401484 A | 8/2018 |
| CN | 108737045 A | 11/2018 |
| CN | 108924948 A | 11/2018 |
| KR | 20180103717 A | 9/2018 |
| WO | 2017182927 A1 | 10/2017 |
| WO | 2018192552 A1 | 10/2018 |

OTHER PUBLICATIONS

"3rd Generation Partnership Project; Technical Specification Group Radio Access Network;NR;Packet Data Convergence Protocol (PDCP) specification (Release 15)," 3GPP TS 38.323 V15.3.0, total 26 pages, 3rd Generation Partnership Project, Valbonne, France (Sep. 2018).

"3rd Generation Partnership Project;Technical Specification Group Radio Access Network;NR; NR and NG-RAN Overall Description;Stage 2(Release 15)," 3GPP TS 38.300 V15.3.1, total 92 pages, 3rd Generation Partnership Project, Valbonne, France (Oct. 2018).

"3rd Generation Partnership Project;Technical Specification Group Radio Access Network;NR;Radio Resource Control (RRC) protocol specification(Release 15)," 3GPP TS 38.331 V15.3.0, total 445 pages, 3rd Generation Partnership Project, Valbonne, France (Sep. 2018).

* cited by examiner

TRANSMISSION MODE SELECTION METHOD AND DEVICE

CROSS-REFERENCE TO RELATED APPLICATIONS

This application is a continuation of International Application No. PCT/CN2019/129299, filed on Dec. 27, 2019, which claims priority to Chinese Patent Application No. 201910005020.0, filed on Jan. 3, 2019. The disclosures of the aforementioned applications are hereby incorporated by reference in their entireties.

TECHNICAL FIELD

This application relates to the field of communications technologies, and in particular, to a transmission mode selection method and a device.

BACKGROUND

A duplication function at a packet data convergence protocol (DCP) layer is introduced in a 5th generation mobile communications technology (the 5th generation, 5G) system. The duplication at the PDCP layer usually means that a data packet of a radio bearer is duplicated to obtain two identical packets (that is, repeated packets). Then, the two data packets are separately delivered to two different radio link control (RLC) entities for transmission, and then are transmitted to a media access control (MAC) layer through different logical channels. To ensure reliability of data transmission, the original data packet and the duplicate data packet that are transmitted to the MAC layer cannot be transmitted by using a same MAC protocol data unit (PDU). This is because only when different MAC PDUs are used for transmission, transmission of a data packet in a MAC PDU is not affected when a data packet in another MAC PDU is lost. That is, reliability is doubled. Therefore, two data packets may be placed in different MAC PDUs through different logical channels, and finally transmitted on different carriers.

The duplication at the PDCP layer may be implemented in two forms: One is dual connectivity (DC) duplication at the PDCP layer, and the other is carrier aggregation (CA) duplication at the PDCP layer.

In a DC architecture, one terminal device communicates with two base stations. If a DC duplication function at PDCP is configured for a radio bearer, the PDCP layer duplicates a data packet to obtain two copies, and the two data packets are to be transmitted to two different RLC entities, and transmitted to different MAC entities through different logical channels. Finally, two MAC PDUs are formed and transmitted on different carriers.

In a CA architecture, one terminal device is connected to one base station, and the base station has more than one carrier to serve the terminal device. Assuming that a radio bearer is configured with a PDCP duplication function in the CA architecture, the PDCP layer duplicates a data packet to obtain two copies, and the two data packets are to be transmitted to two different RLC entities. During packet assembly at a MAC layer, the two data packets are placed in different MAC PDUs for packet assembly, and finally are transmitted on different carriers.

Currently, in the 5G system, only CA duplication at PDCP or DC duplication at PDCP can be configured for one radio bearer. However, due to a dynamic change of a radio channel, existing CA duplication at PDCP or DC duplication at PDCP may fail to meet reliability requirements of some services in some time periods.

SUMMARY

Embodiments of this application provide a transmission mode selection method and a device, to meet a reliability requirement of a service as much as possible.

According to a first aspect, a first transmission mode selection method is provided, where the method includes: determining first indication information, where the first indication information is used to indicate a changed transmission mode and/or indicate to change a transmission mode; and sending the first indication information to a terminal device, where the transmission mode includes one of a first mode, a second mode, a third mode, a fourth mode, or a fifth mode, where in the first mode, a data packet is duplicated at a PDCP layer to obtain N copies of data packets, and the N copies of data packets are transmitted via N network devices connected to the terminal device, where N is an integer greater than or equal to 2; in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, where F is an integer greater than or equal to 2; in the third mode, a data packet is duplicated at a PDCP layer to obtain F copies of data packets, the F copies of data packets are transmitted via one network device connected to the terminal device, and the F copies of data packets are sent to the network device by using F logical channels of the terminal device; and another data packet is duplicated at the PDCP layer to obtain K copies of data packets, the K copies of data packets are transmitted via another network device, and the K copies of data packets are sent to the another network device by using K logical channels of the terminal device, where both F and K are integers greater than or equal to 2; in the fourth mode, a data packet is duplicated at a PDCP layer to obtain M copies of data packets, the M copies of data packets are transmitted via H network devices connected to the terminal device, and each of the H network devices transmits at least one of the M copies of data packets, where both M and H are integers greater than or equal to 2, and H is less than M; and in the fifth mode, a data packet is not duplicated at a PDCP layer, and the data packet is transmitted to a network device connected to the terminal device.

The method may be performed by a first communications apparatus. The first communications apparatus is, for example, a network device or a communications apparatus that can support a network device in implementing a function required in the method, or may be, for example, a chip that can be disposed in a network device. For example, the network device is a base station.

In this embodiment of this application, there may be a plurality of transmission modes for transmitting a data packet duplicated at a PDCP layer, in other words, there may be a plurality of modes for PDCP duplication. A transmission mode can be selected by using the first indication information. For example, when reliability of a mode for PDCP duplication is not high, another transmission mode can be selected by using the first indication information. In this way, a reliability requirement of a service is met as much as possible, thereby improving transmission quality of the service.

With reference to the first aspect, in a possible implementation of the first aspect, that the first indication information is used to indicate a changed transmission mode and indicate to change a transmission mode includes: the first indication information is used to indicate to change a transmission mode, and indicate that a changed transmission mode is one of the first mode, the second mode, the third mode, the fourth mode, or the fifth mode.

The first indication information may specifically indicate to switch between the foregoing five modes. For example, when reliability of a mode for PDCP duplication is not high, the first indication information may be used to indicate the terminal device to switch to another transmission mode. In this way, a reliability requirement of a service is met as much as possible, thereby improving transmission quality of the service.

With reference to the first aspect, in a possible implementation of the first aspect, when the changed transmission mode indicated by the first indication information is the second mode, the first indication information further indicates the network device; or the method further includes: sending second indication information to the terminal device, where the second indication information is used to indicate a first network device in network devices connected to the terminal device, and the first network device is the network device.

In the second mode, the terminal device sends a data packet to one network device, and therefore, the terminal device needs to determine to which network device the data packet is to be sent. For example, the network device may be indicated by the first indication information, or may be indicated by a network device. For example, the network device performs configuration when configuring a radio bearer. For example, the network device sends configuration signaling to the terminal device to configure the radio bearer. The configuration signaling may carry the second indication information, and the second indication information may indicate the first network device in the network devices connected to the terminal device. In this case, if the terminal device enters the second mode, the terminal device may transmit the data packet to the first network device. The first network device may be a master network device connected to the terminal device, or may be a secondary network device or another network device. The first indication information or another manner is used to indicate a network device to which the terminal device sends a data packet in the second mode, so that the terminal device can determine how to implement the second mode.

With reference to the first aspect, in a possible implementation of the first aspect, when the changed transmission mode indicated by the first indication information is the fifth mode, the first indication information further indicates to transmit, after the transmission mode changes, a data packet to a second network device connected to the terminal device, or indicates to use a split transmission mode after the transmission mode changes; or the method further includes: sending second indication information to the terminal device, where the second indication information is used to indicate a first network device in network devices connected to the terminal device, where the split transmission mode is a mode in which the terminal device determines, based on a first data volume threshold, to transmit a data packet to a network device connected to the terminal device.

In the fifth mode, the terminal device does not need to send, to the network device, a data packet that is obtained through duplication at the PDCP layer, but the terminal device may still need to send, to the network device, a data packet that is not duplicated at the PDCP layer. In this case, the terminal device also needs to know to which network devices the data packet is to be sent. For example, the network device may be indicated by the first indication information, or may be indicated by a network device. For example, the network device performs configuration when configuring a radio bearer. For example, the network device sends configuration signaling to the terminal device to configure the radio bearer. The configuration signaling may carry the second indication information, and the second indication information may indicate the first network device in the network devices connected to the terminal device. In this case, if the terminal device enters the fifth mode, the terminal device may transmit the data packet to the first network device. There may be one or more first network devices. The first network device may be a master network device connected to the terminal device, or may be a secondary network device or another network device. Similarly, there may be one or more second network devices. The second network device may be a master network device connected to the terminal device, or may be a secondary network device or another network device. The first indication information or another manner is used to indicate a network device to which the terminal device sends a data packet in the fifth mode, so that the terminal device can determine how to implement the fifth mode.

With reference to the first aspect, in a possible implementation of the first aspect, when the first indication information indicates to transmit, after the transmission mode changes, the data packet to the second network device connected to the terminal device, the first indication information further indicates to transmit the data packet to the second network device by using a first logical channel or a first radio link control RLC entity; or the method further includes: sending the second indication information to the terminal device, where the second indication information is used to indicate a first logical channel or a first RLC entity, and the terminal device transmits the data packet to the second network device by using the first logical channel or the first RLC entity.

Corresponding to one network device, the terminal device may have a plurality of logical channels or a plurality of RLC entities. However, in the fifth mode, because the terminal device transmits a data packet that is not duplicated at the PDCP layer, the terminal device may transmit the data packet to one network device by using only one logical channel or one RLC entity. Therefore, the network device may be indicated by the first indication information, or may be indicated by a network device. For example, the network device performs configuration when configuring a radio bearer. For example, the network device sends configuration signaling to the terminal device to configure the radio bearer. The configuration signaling may carry the second indication information, and the second indication information may indicate that the terminal device corresponds to the first logical channel or the first RLC entity of the second network device. In this case, if the terminal device enters the fifth mode, the terminal device may transmit the data packet to the first network device by using the first logical channel or the first RLC entity. There may be one or more first logical channels. A quantity of first logical channels is the same as a quantity of first network devices, and is also the same as a quantity of first RLC entities. The first indication information or another manner is used to indicate, to the terminal device, a logical channel or an RLC entity to be used by the terminal device to send a data packet to a corresponding network device in the fifth mode, so that the terminal device can determine how to implement the fifth mode.

With reference to the first aspect, in a possible implementation of the first aspect, when the first indication information indicates to use the split transmission mode after the transmission mode changes, the first indication information further indicates a logical channel or an RLC entity to be used by the terminal device when the terminal device transmits a data packet to each network device connected to the terminal device; or the method further includes: sending second indication information to the terminal device, where the second indication information is used to indicate a logical channel or an RLC entity to be used by the terminal device when the terminal device transmits a data packet to each network device connected to the terminal device.

If the split transmission mode is used after the transmission mode changes, after selecting a network device based on the first data volume threshold, the terminal device may determine, based on the first indication information or the second indication information, logical channels or RLC entities to be used to send the data packet to the corresponding network device.

With reference to the first aspect, in a possible implementation of the first aspect, when the first indication information is used to indicate to change the current transmission mode, and the current transmission mode is the second mode, the first indication information is further used to indicate to transmit a data packet to the network device by using a second logical channel or a second RLC entity; or the method further includes: sending second indication information to the terminal device, where the second indication information is used to indicate a second logical channel or a second RLC entity, and the terminal device transmits a data packet to the network device by using the second logical channel or the second RLC entity.

In the second mode, because a data packet duplicated at the PDCP layer needs to be sent to one network device, the terminal device sends the data packet to the network device by using a plurality of logical channels or a plurality of RLC entities. If the terminal device exits the second mode, for example, the first indication information indicates to switch the transmission mode from the second mode to another mode, in the another mode, the terminal device may not need to send, to the network device, a data packet that is obtained through duplication at the PDCP layer. For example, the first indication information indicates to switch the transmission mode from the second mode to the fifth mode. In the fifth mode, the terminal device may need to send, to the network device by using only one logical channel or one RLC entity, a data packet that is not duplicated at the PDCP layer. Therefore, the terminal device needs to determine a logical channel or an RLC entity to be used to send the data packet to the network device. In this case, the first indication information or the second indication information may be used for indication, so that the terminal device can determine a logical channel or an RLC entity to be used to send the data packet to the network device.

With reference to the first aspect, in a possible implementation of the first aspect, when the first indication information is used to indicate to change the current transmission mode, and the current transmission mode is the first mode, the first indication information is further used to indicate to transmit a data packet to a third network device in the N network devices after the transmission mode changes; or the method further includes: sending second indication information to the terminal device, where the second indication information is used to indicate to transmit a data packet to a third network device in the N network devices when the current transmission mode is not the first mode.

In the first mode, the terminal device sends the data packets to the N network devices. If the transmission mode switches from the first mode to another mode, the terminal device may not need to send the data packets to the N network devices in the another mode. For example, the terminal device may send data packets to only some of the N network devices, and therefore, the terminal device needs to determine network devices to which data packets are to be sent after the transmission mode changes. Therefore, the first indication information or the second indication information may be used for indication. There may be one or more third network devices, and the third network devices may include a master network device and/or a secondary network device of the terminal device. This is not specifically limited.

According to a second aspect, a second transmission mode selection method is provided, where the method includes: receiving first indication information; and determining, based on the first indication information, a changed transmission mode and/or to change a transmission mode, where the transmission mode includes one of a first mode, a second mode, a third mode, a fourth mode, or a fifth mode, where in the first mode, a data packet is duplicated at a PDCP layer to obtain N copies of data packets, and the N copies of data packets are transmitted via N network devices connected to the terminal device, where N is an integer greater than or equal to 2; in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, where F is an integer greater than or equal to 2; in the third mode, a data packet is duplicated at a PDCP layer to obtain F copies of data packets, the F copies of data packets are transmitted via one network device connected to the terminal device, and the F copies of data packets are sent to the network device by using F logical channels of the terminal device; and another data packet is duplicated at the PDCP layer to obtain K copies of data packets, the K copies of data packets are transmitted via another network device, and the K copies of data packets are sent to the another network device by using K logical channels of the terminal device, where both F and K are integers greater than or equal to 2; in the fourth mode, a data packet is duplicated at a PDCP layer to obtain M copies of data packets, the M copies of data packets are transmitted via H network devices connected to the terminal device, and each of the H network devices transmits at least one of the M copies of data packets, where both M and H are integers greater than or equal to 2, and H is less than M; and in the fifth mode, a data packet is not duplicated at a PDCP layer, and the data packet is transmitted to a network device connected to the terminal device.

The method may be performed by a second communications apparatus. The second communications apparatus is, for example, a terminal device or a communications apparatus that can support the terminal device in implementing a function required in the method, or may be, for example, a chip that can be disposed in a terminal device.

With reference to the second aspect, in a possible implementation of the second aspect, the determining, based on the first indication information, a changed transmission mode and to change a transmission mode includes: determining, based on the first indication information, to change a transmission mode, and determining that a changed transmission mode is one of the first mode, the second mode, the third mode, the fourth mode, or the fifth mode.

With reference to the second aspect, in a possible implementation of the second aspect, when the changed transmission mode indicated by the first indication information is the second mode, the method further includes: determining the network device based on the first indication information; or the method further includes: receiving second indication information, and determining, based on the second indication information, a first network device in network devices connected to the terminal device, where the first network device is the network device.

With reference to the second aspect, in a possible implementation of the second aspect, when the changed transmission mode indicated by the first indication information is the fifth mode, the method further includes: determining, based on the first indication information, to transmit, after the transmission mode changes, a data packet to a second network device connected to the terminal device; or determining, based on the first indication information, to use a split transmission mode after the transmission mode changes; or the method further includes: receiving second indication information, and determining, based on the second indication information, a first network device in network devices connected to the terminal device, where the split transmission mode is a mode in which the terminal device determines, based on a first data volume threshold, to transmit a data packet to at least one network device connected to the terminal device.

With reference to the second aspect, in a possible implementation of the second aspect, after the determining to use a split transmission mode after the transmission mode changes, the method further includes: determining whether an amount of to-be-transmitted data is less than a first data volume threshold; and transmitting a data packet to one network device when the amount of the to-be-transmitted data is less than the first data volume threshold, or transmitting a data packet to a plurality of network devices when the amount of the to-be-transmitted data is greater than or equal to the first data volume threshold.

In the split transmission mode, the terminal device may choose, based on the first data volume threshold, to send a data packet to one or more network devices. For example, if the amount of the to-be-transmitted data of the terminal device is relatively small, the terminal device needs to send a data packet to only one network device. This reduces interaction between the terminal device and the network device, and reduces load of more network devices. If the amount of the to-be-transmitted data of the terminal device is relatively large, the terminal device may send data packets to a plurality of network devices, so that the data packets of the terminal device can be transmitted in time to a maximum extent.

With reference to the second aspect, in a possible implementation of the second aspect, when it is determined, based on the first indication information, to transmit, after the transmission mode changes, the data packet to the second network device connected to the terminal device, the method further includes: determining, based on the first indication information, to transmit the data packet to the second network device by using a first logical channel and/or a first radio link control RLC entity; or the method further includes: receiving the second indication information, determining a first logical channel or a first RLC entity based on the second indication information, and transmitting, by the terminal device, the data packet to the second network device by using the first logical channel or the first RLC entity.

With reference to the second aspect, in a possible implementation of the second aspect, when the first indication information indicates to use a split transmission mode after the transmission mode changes, the method further includes: determining, based on the first indication information, a logical channel or an RLC entity to be used by the terminal device when the terminal device transmits a data packet to each network device connected to the terminal device; or the method further includes: receiving second indication information, and determining, based on the second indication information, a logical channel or an RLC entity to be used by the terminal device when the terminal device transmits a data packet to each network device connected to the terminal device.

With reference to the second aspect, in a possible implementation of the second aspect, when it is determined, based on the first indication information, to change the current transmission mode, and the current transmission mode is the second mode, the method further includes: determining, based on the first indication information, to transmit a data packet to the network device by using a second logical channel or a second RLC entity; or the method further includes: receiving second indication information, determining a second logical channel or a second RLC entity based on the second indication information, and transmitting, by the terminal device, a data packet to the network device by using the second logical channel or the second RLC entity.

With reference to the second aspect, in a possible implementation of the second aspect, when it is determined, based on the first indication information, to change the current transmission mode, and the current transmission mode is the first mode, the method further includes: determining, based on the first indication information, to transmit a data packet to a third network device in the N network devices after the transmission mode changes; or the method further includes: receiving second indication information, and transmitting a data packet to a third network device in the N network devices when it is determined, based on the second indication information, that the current transmission mode is not the first mode.

For a technical effect of any one of the second aspect or the possible implementations of the second aspect, refer to the description of the first aspect or the possible implementations of the first aspect.

According to a third aspect, a first communications apparatus is provided. For example, the communications apparatus is the first communications apparatus described above. The communications apparatus is configured to perform the method according to any one of the first aspect or the possible implementations of the first aspect. Specifically, the communications apparatus may include modules configured to perform the method according to any one of the first aspect or the possible implementations of the first aspect, for example, include a processing module and a transceiver module that are coupled to each other. For example, the communications apparatus is a communications device. For example, the communications device is a network device.

The processing module is configured to determine first indication information, where the first indication information is used to indicate a changed transmission mode and/or indicate to change a transmission mode.

The transceiver module is configured to send the first indication information to a terminal device, where the transmission mode includes one of a first mode, a second mode, a third mode, a fourth mode, or a fifth mode, where in the first mode, a data packet is duplicated at a PDCP layer to obtain N copies of data packets, and the N copies of data packets are transmitted via N network devices connected to the terminal device, where N is an integer greater than or equal to 2;

in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, where F is an integer greater than or equal to 2;

in the third mode, a data packet is duplicated at a PDCP layer to obtain F copies of data packets, the F copies of data packets are transmitted via one network device connected to the terminal device, and the F copies of data packets are sent to the network device by using F logical channels of the terminal device; and another data packet is duplicated at the PDCP layer to obtain K copies of data packets, the K copies of data packets are transmitted via another network device, and the K copies of data packets are sent to the another network device by using K logical channels of the terminal device, where both F and K are integers greater than or equal to 2;

in the fourth mode, a data packet is duplicated at a PDCP layer to obtain M copies of data packets, the M copies of data packets are transmitted via H network devices connected to the terminal device, and each of the H network devices transmits at least one of the M copies of data packets, where both M and H are integers greater than or equal to 2, and H is less than M; and in the fifth mode, a data packet is not duplicated at a PDCP layer, and the data packet is transmitted to a network device connected to the terminal device.

With reference to the third aspect, in a possible implementation of the third aspect, that the first indication information is used to indicate a changed transmission mode and indicate to change a transmission mode includes: the first indication information is used to indicate to change a transmission mode, and indicate that a changed transmission mode is one of the first mode, the second mode, the third mode, the fourth mode, or the fifth mode.

With reference to the third aspect, in a possible implementation of the third aspect, when the changed transmission mode indicated by the first indication information is the second mode, the first indication information further indicates the network device; or the transceiver module is further configured to send second indication information to the terminal device, where the second indication information is used to indicate a first network device in network devices connected to the terminal device, and the first network device is the network device.

With reference to the third aspect, in a possible implementation of the third aspect, when the changed transmission mode indicated by the first indication information is the fifth mode, the first indication information further indicates to transmit, after the transmission mode changes, a data packet to a second network device connected to the terminal device, or indicates to use a split transmission mode after the transmission mode changes; or the transceiver module is further configured to send second indication information to the terminal device, where the second indication information is used to indicate a first network device in network devices connected to the terminal device, where the split transmission mode is a mode in which the terminal device determines, based on a first data volume threshold, to transmit a data packet to at least one network device connected to the terminal device.

With reference to the third aspect, in a possible implementation of the third aspect, when the first indication information indicates to transmit, after the transmission mode changes, the data packet to the second network device connected to the terminal device, the first indication information further indicates to transmit the data packet to the second network device by using a first logical channel or a first radio link control RLC entity; or the transceiver module is further configured to send second indication information to the terminal device, where the second indication information is used to indicate a first logical channel or a first RLC entity, and the terminal device transmits the data packet to the second network device by using the first logical channel or the first RLC entity.

With reference to the third aspect, in a possible implementation of the third aspect, when the first indication information indicates to use the split transmission mode after the transmission mode changes, the first indication information further indicates a logical channel or an RLC entity to be used by the terminal device when the terminal device transmits a data packet to each network device connected to the terminal device; or the transceiver module is further configured to send second indication information to the terminal device, where the second indication information is used to indicate a logical channel or an RLC entity to be used by the terminal device when the terminal device transmits a data packet to each network device connected to the terminal device.

With reference to the third aspect, in a possible implementation of the third aspect, when the first indication information is used to indicate to change the current transmission mode, and the current transmission mode is the second mode, the first indication information is further used to indicate to transmit a data packet to the network device by using a second logical channel or a second RLC entity; or the transceiver module is further configured to send second indication information to the terminal device, where the second indication information is used to indicate a second logical channel or a second RLC entity, and the terminal device transmits a data packet to the network device by using the second logical channel or the second RLC entity.

With reference to the third aspect, in a possible implementation of the third aspect, when the first indication information is used to indicate to change the current transmission mode, and the current transmission mode is the first mode, the first indication information is further used to indicate to transmit a data packet to a third network device in the N network devices after the transmission mode changes; or the transceiver module is further configured to send second indication information to the terminal device, where the second indication information is used to indicate to transmit a data packet to a third network device in the N network devices when the current transmission mode is not the first mode.

For a technical effect of any one of the third aspect or the possible implementations of the third aspect, refer to the description of the first aspect or the possible implementations of the first aspect.

According to a fourth aspect, a second communications apparatus is provided. For example, the communications apparatus is the second communications apparatus described above. The communications apparatus is configured to perform the method according to any one of the second aspect or the possible implementations of the second aspect. Specifically, the communications device may include modules configured to perform the method according to any one of the second aspect or the possible implementations of the second aspect, for example, include a processing module and a transceiver module that are coupled to each other. For example, the communications apparatus is a communications device. For example, the communications device is a terminal device.

The transceiver module is configured to receive first indication information.

The processing module is configured to determine, based on the first indication information, a changed transmission mode and/or to change a transmission mode, where the transmission mode includes one of a first mode, a second mode, a third mode, a fourth mode, or a fifth mode, where in the first mode, a data packet is duplicated at a packet data convergence protocol PDCP layer to obtain N copies of data packets, and the N copies of data packets are transmitted via N network devices connected to the terminal device, where N is an integer greater than or equal to 2;

in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, where F is an integer greater than or equal to 2;

in the third mode, a data packet is duplicated at a PDCP layer to obtain F copies of data packets, the F copies of data packets are transmitted via one network device connected to the terminal device, and the F copies of data packets are sent to the network device by using F logical channels of the terminal device; and another data packet is duplicated at the PDCP layer to obtain K copies of data packets, the K copies of data packets are transmitted via another network device, and the K copies of data packets are sent to the another network device by using K logical channels of the terminal device, where both F and K are integers greater than or equal to 2;

in the fourth mode, a data packet is duplicated at a PDCP layer to obtain M copies of data packets, the M copies of data packets are transmitted via H network devices connected to the terminal device, and each of the H network devices transmits at least one of the M copies of data packets, where both M and H are integers greater than or equal to 2, and H is less than M; and in the fifth mode, a data packet is not duplicated at a PDCP layer, and the data packet is transmitted to a network device connected to the terminal device.

With reference to the fourth aspect, in a possible implementation of the fourth aspect, the processing module is configured to determine, based on the first indication information and in the following manner, a changed transmission mode and to change a transmission mode: determining, based on the first indication information, to change a transmission mode, and determining that a changed transmission mode is one of the first mode, the second mode, the third mode, the fourth mode, or the fifth mode.

With reference to the fourth aspect, in a possible implementation of the fourth aspect, when the changed transmission mode indicated by the first indication information is the second mode, the processing module is further configured to determine the network device based on the first indication information; or the transceiver module is further configured to: receive second indication information, and determine, based on the second indication information, a first network device in network devices connected to the terminal device, where the first network device is the network device.

With reference to the fourth aspect, in a possible implementation of the fourth aspect, when the changed transmission mode indicated by the first indication information is the fifth mode, the processing module is further configured to: determine, based on the first indication information, to transmit, after the transmission mode changes, a data packet to a second network device connected to the terminal device; or determine, based on the first indication information, to use a split transmission mode after the transmission mode changes; or the transceiver module is further configured to: receive second indication information, and determine, based on the second indication information, a first network device in network devices connected to the terminal device, where the split transmission mode is a mode in which the terminal device determines, based on a first data volume threshold, to transmit a data packet to at least one network device connected to the terminal device.

With reference to the fourth aspect, in a possible implementation of the fourth aspect, the processing module is further configured to determine whether an amount of to-be-transmitted data is less than a first data volume threshold after determining to use the split transmission mode after the transmission mode changes; and the transceiver module is further configured to: transmit a data packet to one network device when the amount of the to-be-transmitted data is less than the first data volume threshold, or transmit a data packet to a plurality of network devices when the amount of the to-be-transmitted data is greater than or equal to the first data volume threshold.

With reference to the fourth aspect, in a possible implementation of the fourth aspect, when the processing module determines, based on the first indication information, to transmit, after the transmission mode changes, the data packet to the second network device connected to the terminal device, the processing module is further configured to determine, based on the first indication information, to transmit the data packet to the second network device by using a first logical channel and/or a first radio link control RLC entity; or the transceiver module is further configured to: receive the second indication information, determine a first logical channel or a first RLC entity based on the second indication information, and transmit, by the terminal device, the data packet to the second network device by using the first logical channel or the first RLC entity.

With reference to the fourth aspect, in a possible implementation of the fourth aspect, when the first indication information indicates to use the split transmission mode after the transmission mode changes, the processing module is further configured to determine, based on the first indication information, a logical channel or an RLC entity to be used by the terminal device when the terminal device transmits a data packet to each network device connected to the terminal device; or the transceiver module is further configured to: receive second indication information, and determine, based on the second indication information, a logical channel or an RLC entity to be used by the terminal device when the terminal device transmits a data packet to each network device connected to the terminal device.

With reference to the fourth aspect, in a possible implementation of the fourth aspect, when the processing module determines, based on the first indication information, to change the current transmission mode, and the current transmission mode is the second mode, the processing module is further configured to determine, based on the first indication information, to transmit a data packet to the network device by using a second logical channel or a second RLC entity; or the transceiver module is further configured to: receive second indication information, determine a second logical channel or a second RLC entity based on the second indication information, and transmit, by the terminal device, a data packet to the network device by using the second logical channel or the second RLC entity.

With reference to the fourth aspect, in a possible implementation of the fourth aspect, when the processing module determines, based on the first indication information, to change the current transmission mode, and the current transmission mode is the first mode, the processing module is further configured to determine, based on the first indication information, to transmit a data packet to a third network device in the N network devices after the transmission mode changes; or the transceiver module is further configured to: receive second indication information, and transmit a data packet to a third network device in the N network devices when determining, based on the second indication information, that the current transmission mode is not the first mode.

For a technical effect of any one of the fourth aspect or the possible implementations of the fourth aspect, refer to the description of the second aspect or the possible implementations of the second aspect.

According to a fifth aspect, a third communications apparatus is provided. For example, the communications apparatus is the first communications apparatus described above. The communications apparatus includes a processor and a transceiver, configured to implement the method described in the first aspect or the possible designs of the first aspect. For example, the communications apparatus is a chip disposed in a communications device. For example, the communications device is a network device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

According to a sixth aspect, a fourth communications apparatus is provided. For example, the communications apparatus is the second communications apparatus described above. The communications apparatus includes a processor and a transceiver, configured to implement the method described in the second aspect or the possible designs of the second aspect. For example, the communications apparatus is a chip disposed in a communications device. For example, the communications device is a terminal device. For example, the transceiver is implemented by using an antenna, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

According to a seventh aspect, a fifth communications apparatus is provided. The communications apparatus may be the first communications apparatus in the foregoing method designs. For example, the communications apparatus is a chip disposed in a network device. The communications apparatus includes: a memory, configured to store computer executable program code; and a processor, where the processor is coupled to the memory. The program code stored in the memory includes an instruction. When the processor executes the instruction, the fifth communications apparatus is enabled to perform the method according to any one of the first aspect or the possible implementations of the first aspect.

The fifth communications apparatus may further include a communications interface. The communications interface may be a transceiver in the network device, and is implemented by using, for example, an antenna, a feeder, and a codec in the communications apparatus. Alternatively, if the fifth communications apparatus is the chip disposed in the network device, the communications interface may be an input/output interface of the chip, for example, an input/output pin.

According to an eighth aspect, a sixth communications apparatus is provided. The communications apparatus may be the second communications apparatus in the foregoing method designs. For example, the communications apparatus is a chip disposed in a terminal device. The communications apparatus includes: a memory, configured to store computer executable program code; and a processor, where the processor is coupled to the memory. The program code stored in the memory includes an instruction. When the processor executes the instruction, the sixth communications apparatus is enabled to perform the method according to any one of the second aspect or the possible implementations of the second aspect.

The sixth communications apparatus may further include a communications interface. The communications interface may be a transceiver in the terminal device, and is implemented by using, for example, an antenna and a codec in the communications apparatus. Alternatively, if the sixth communications apparatus is the chip disposed in the terminal device, the communications interface may be an input/output interface of the chip, for example, an input/output pin.

According to a ninth aspect, a communications system is provided. The communications system may include the first communications apparatus according to the third aspect, the third communications apparatus according to the fifth aspect, or the fifth communications apparatus according to the seventh aspect, and include the second communications apparatus according to the fourth aspect, the fourth communications apparatus according to the sixth aspect, or the sixth communications apparatus according to the eighth aspect.

According to a tenth aspect, a computer storage medium is provided. The computer readable storage medium stores an instruction, and when the instruction is run on a computer, the computer is enabled to perform the method according to any one of the first aspect or the possible designs of the first aspect.

According to an eleventh aspect, a computer storage medium is provided. The computer readable storage medium stores an instruction, and when the instruction is run on a computer, the computer is enabled to perform the method according to any one of the second aspect or the possible designs of the second aspect.

According to a twelfth aspect, a computer program product including an instruction is provided. The computer program product stores the instruction, and when the instruction is run on a computer, the computer is enabled to perform the method according to any one of the first aspect or the possible designs of the first aspect.

According to a thirteenth aspect, a computer program product including an instruction is provided. The computer program product stores the instruction, and when the instruction is run on a computer, the computer is enabled to perform the method according to any one of the second aspect or the possible designs of the second aspect.

In short, in the embodiments of this application, a transmission mode can be selected by using the first indication information. For example, when reliability of a mode for PDCP duplication is not high, another transmission mode can be selected by using the first indication information. In this way, a reliability requirement of a service is met as much as possible, thereby improving transmission quality of the service.

DESCRIPTION OF EMBODIMENTS

Figure 1:
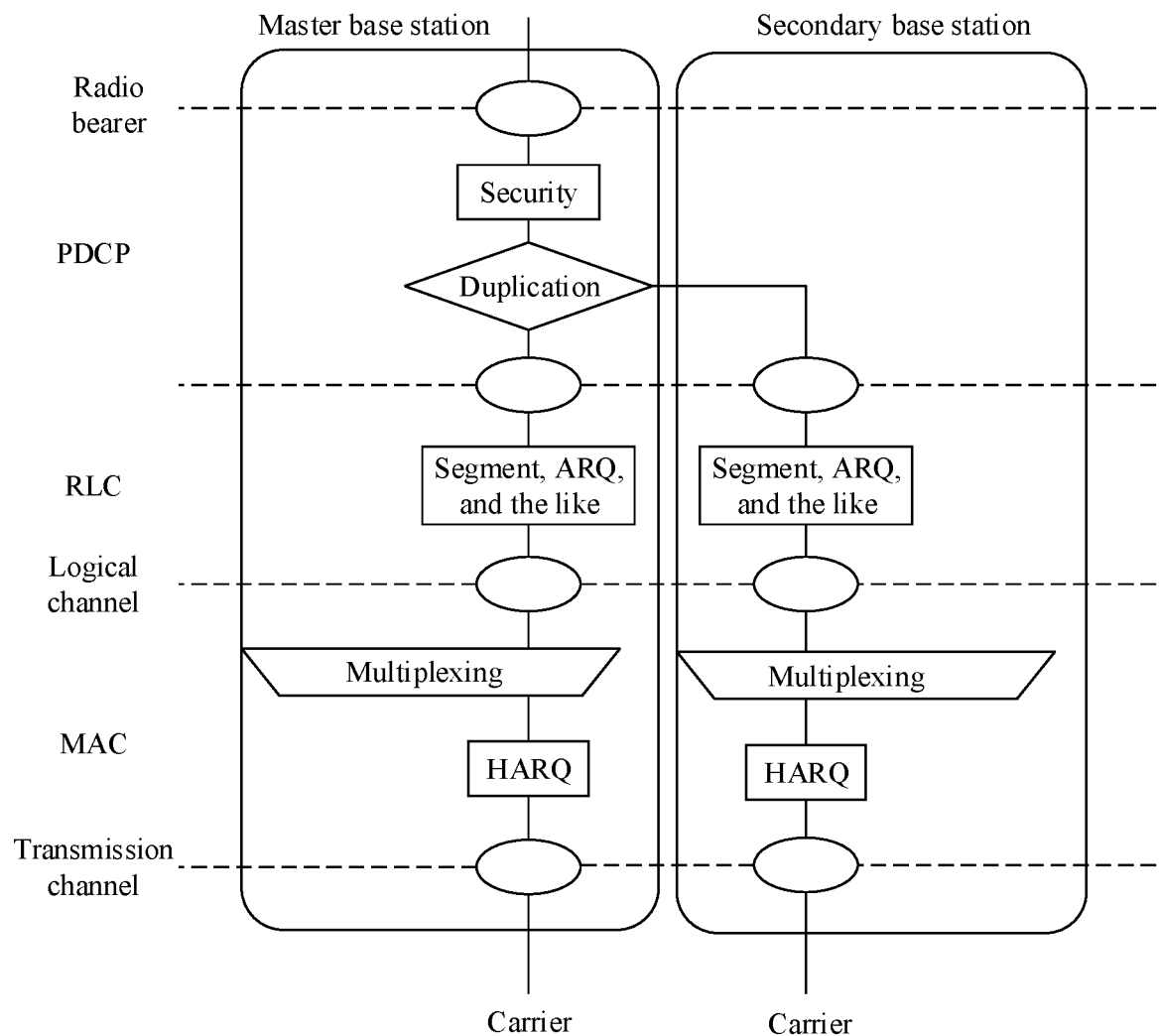
FIG. 1 shows a network architecture related to implementation of a duplication process at a PDCP layer in a DC scenario.

To make objectives, technical solutions and advantages of embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, computer built-in, or vehicle-mounted mobile apparatus. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

By way of example rather than limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of the user. The wearable device is not only a hardware device, but is used to implement a powerful function through software support, a data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) A network device includes, for example, an access network (access network, AN) device. The access network device, for example, a base station (for example, an access point), may be a device that is in an access network and that communicates with a wireless terminal device over an air interface through one or more cells. The network device may be configured to: mutually convert a received over-the-air frame and an internet protocol (IP) packet, and serve as a router between the terminal device and a rest portion of the access network, where the rest portion of the access network may include an IP network. The network device may coordinate attribute management of the air interface. For example, the network device may include an evolved NodeB (NodeB, or eNB, or e-NodeB, evolved NodeB) in a long term evolution (LTE) system or an LTE advanced (LTE-Advanced, LTE-A) system, or may include a next generation NodeB (next generation nodeB, gNB) in a 5th generation mobile communications technology (the fifth generation, 5G) new radio (new radio, NR) system, or may include a centralized unit (CU) and a distributed unit (DU) in a cloud access network (CloudRAN) system. This is not limited in the embodiments of this application.

(3) Dual connectivity (DC) means that a terminal device is connected to two base stations. The two base stations connected to the terminal device may be base stations in a same radio access technology. For example, both are base stations in an LTE system or both are base stations in an NR system. Alternatively, the two base stations connected to the terminal device may be base stations in different radio access technologies. For example, one is a base station in an LTE system, and the other is a base station in an NR system.

(4) Carrier aggregation (CA): In the CA technology, a plurality of component carriers (CC) may be aggregated to provide a service for a terminal device, to realize larger transmission bandwidth and effectively improve uplink and downlink transmission rates.

(5) Duplication at a packet data convergence protocol (PDCP) layer means that a PDCP entity duplicates a data packet to obtain a plurality of copies of data packets, and separately delivers the plurality of data packets to different RLC entities, and then the plurality of data packets are transmitted from the RLC layer to a MAC layer through logical channels.

(6) In the embodiments of this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, first indication information and second indication information are merely intended to distinguish between different indication information, but do not indicate that the two types of indication information are different in priorities, sending sequences, importance, or the like.

The foregoing describes some concepts in the embodiments of this application. The following describes technical features in the embodiments of this application.

The duplication at the PDCP layer usually refers to that a data packet of a radio bearer is duplicated at the PDCP layer to obtain a plurality of identical packets (that is, repeated packets), or is duplicated to obtain a plurality of copies, then the plurality of data packets are separately delivered to a plurality of different RLC entities for transmission, and the plurality of data packets are then transmitted to a MAC layer through different logical channels. The logical channel is a channel between the RLC layer and the MAC layer. It should be noted that retransmission that is commonly mentioned performing transmission again (retransmission), but duplication in the embodiments of this application is not retransmission. Re-sending refers to sending a same data packet again after a sending failure, or sending a same data packet for a plurality of consecutive times. Duplication refers to that one data packet is duplicated to obtain two data packets, and the two data packets are separately transmitted through two logical channels. Herein, "duplication" may also be understood as "replication".

To ensure reliability of data transmission, an original packet and a duplicate packet that are transmitted to the MAC layer cannot be transmitted by using a same MAC PDU. This is because only when different MAC PDUs are used for transmission, transmission of a data packet in a PDU is not affected when a data packet in another PDU is lost. That is, reliability is doubled.

The following describes how to implement PDCP duplication in a DC architecture and PDCP duplication in a CA architecture respectively in a DC scenario and a CA scenario.

FIG. 1 is a schematic diagram of a network architecture related to implementation of a duplication process at a PDCP layer in a DC scenario. For a base station, the DC scenario involves a master base station and a secondary base station. Network architectures of the master base station and the secondary base station for one radio bearer are shown in FIG. 1. A network architecture of a terminal device for the radio bearer includes the network architecture of the master base station and the network architecture of the secondary base station shown in FIG. 1, that is, for the radio bearer, the terminal device includes one PDCP entity, two RLC entities, and two MAC entities. Each of security, duplication, segment, automatic repeat-request (ARQ), multiplexing (multiplexing), hybrid automatic repeat request (HARQ), robust header compression (ROHC), and the like in FIG. 1 is a function that represents a PDCP entity, an RLC entity, or a MAC entity. The PDCP entity and the PDCP layer may be understood as a same concept. Similarly, the RLC entity and an RLC layer may be understood as a same concept, and the MAC entity and a MAC layer may be understood as a same concept. A circle in FIG. 1 represents an interface and/or a channel between different layers. The interface is referred to as an inter-layer interface, for example, a service access point (SAP), and the channel is, for example, a logical channel. The same applies below, and details are not described again. It should be noted that FIG. 1 is only an example of the architecture, and each component in the figure is not an indispensable component in the embodiments. For example, the security module can be omitted as required.

In the DC scenario, one terminal device is connected to two base stations, that is, a master base station and a secondary base station. If a duplication function at the PDCP layer is configured for a radio bearer, two data packets obtained through duplication at the PDCP layer are to be transmitted to two different RLC entities, and transmitted to different MAC entities through different logical channels. Finally, two MAC PDUs are formed and transmitted on different carriers. This process is the same for the base station and the terminal device. A difference lies in: For the base station, a PDCP entity in the master base station or the secondary base station transmits two duplicate data packets to two different RLC entities, and the two RLC entities are respectively located in the master base station and the secondary base station. Then, the RLC entity in the master base station transmits the received data packet to a MAC entity in the master base station, and the RCL entity in the secondary base station transmits the received data packet to a MAC entity in the secondary base station. The two MAC entities transmit data packets on respective carriers. For the terminal device, two RCL entities and two MAC entities are both located in the terminal device. Other processes are the same.

Figure 2:
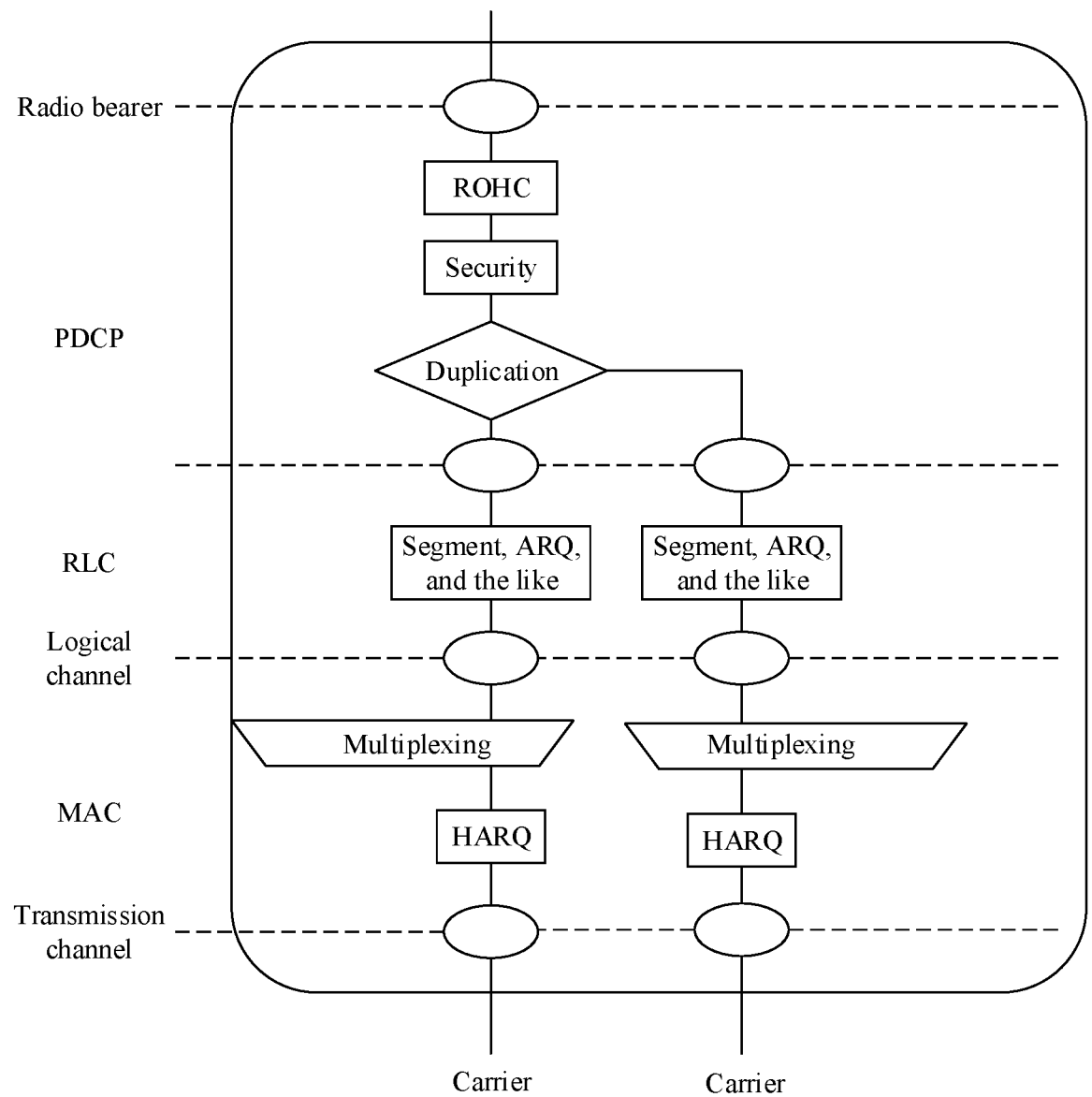
FIG. 2 shows a network architecture related to implementation of a duplication process at a PDCP layer in a CA scenario.

FIG. 2 is a network architecture related to implementation of a duplication process at a PDCP layer in a CA scenario. In the CA scenario, the terminal device is connected to one base station. Network architectures of the base station and the terminal device for one radio bearer are shown in FIG. 2. In other words, both the base station and the terminal device for the radio bearer include one PDCP entity, two RLC entities, and two MAC entities. Each of security, duplication, segment, ARQ, multiplexing, HARQ, ROHC, and the like in FIG. 2 is a function that represents a PDCP entity, an RLC entity, or a MAC entity.

In the CA scenario, one terminal device is connected to one base station, and the base station has more than one carrier to serve the terminal device. Assuming that a duplication function at the PDCP layer is configured for a radio bearer, two data packets obtained through duplication at the PDCP layer are to be transmitted to two different RLC entities. The two RLC entities transmit the two data packets to a same MAC entity by using different logical channels. In this case, because the two data packets are transmitted to the same MAC entity, the MAC entity places the two data packets in one MAC PDU for transmission. Therefore, to enable the two data packets to be transmitted by using the two MAC PDUs, a parameter, for example, a parameter A, may be configured for a logical channel. Values of the parameter A are used to indicate different carriers, to ensure that the two data packets can finally form two MAC PDUs to be transmitted on different carriers.

For example, if a parameter A is configured for a logical channel, it indicates that data in an RLC entity corresponding to the logical channel can be transmitted only on a carrier indicated by the parameter A. In this way, if parameters A configured for two duplicate logical channels indicate different carriers, two duplicate data packets are finally transmitted on the different carriers, so that reliability can be ensured.

Currently, in a 5G system, only PDCP duplication in a CA architecture or PDCP duplication in a DC architecture can be configured for one radio bearer. In addition, for the PDCP duplication in the CA architecture, only a maximum of two legs (leg) can be configured to transmit a data packet that is duplicated at the PDCP layer, that is, a maximum of two logical channels are configured to transmit a data packet that is duplicated at the PDCP layer. Similarly, for the PDCP duplication in the DC architecture, a maximum of two legs can be configured to transmit a data packet that is duplicated at the PDCP layer.

However, the PDCP duplication in the existing CA architecture or the PDCP duplication in the existing DC architecture may fail to meet reliability requirements of some services. For example, it is assumed that the PDCP duplication in the CA architecture is configured for a radio bearer. If quality of all carriers that communicate with the base station is very poor, transmission reliability of a data packet duplicated at the PDCP layer cannot be ensured. Alternatively, it is assumed that the PDCP duplication in the DC architecture is configured for a radio bearer. If quality of all carriers that communicate with one of the two base stations is very poor, transmission reliability of a data packet duplicated at the PDCP layer cannot be ensured either.

In view of this, the technical solutions in the embodiments of this application are provided. In the embodiments of this application, there may be a plurality of transmission modes for transmitting a data packet duplicated at a PDCP layer, in other words, there may be a plurality of modes for PDCP duplication. A transmission mode can be selected by using the first indication information. For example, when reliability of a mode for PDCP duplication is not high, another transmission mode can be selected by using the first indication information. In this way, a reliability requirement of a service is met as much as possible, thereby improving transmission quality of the service.

Figure 3:
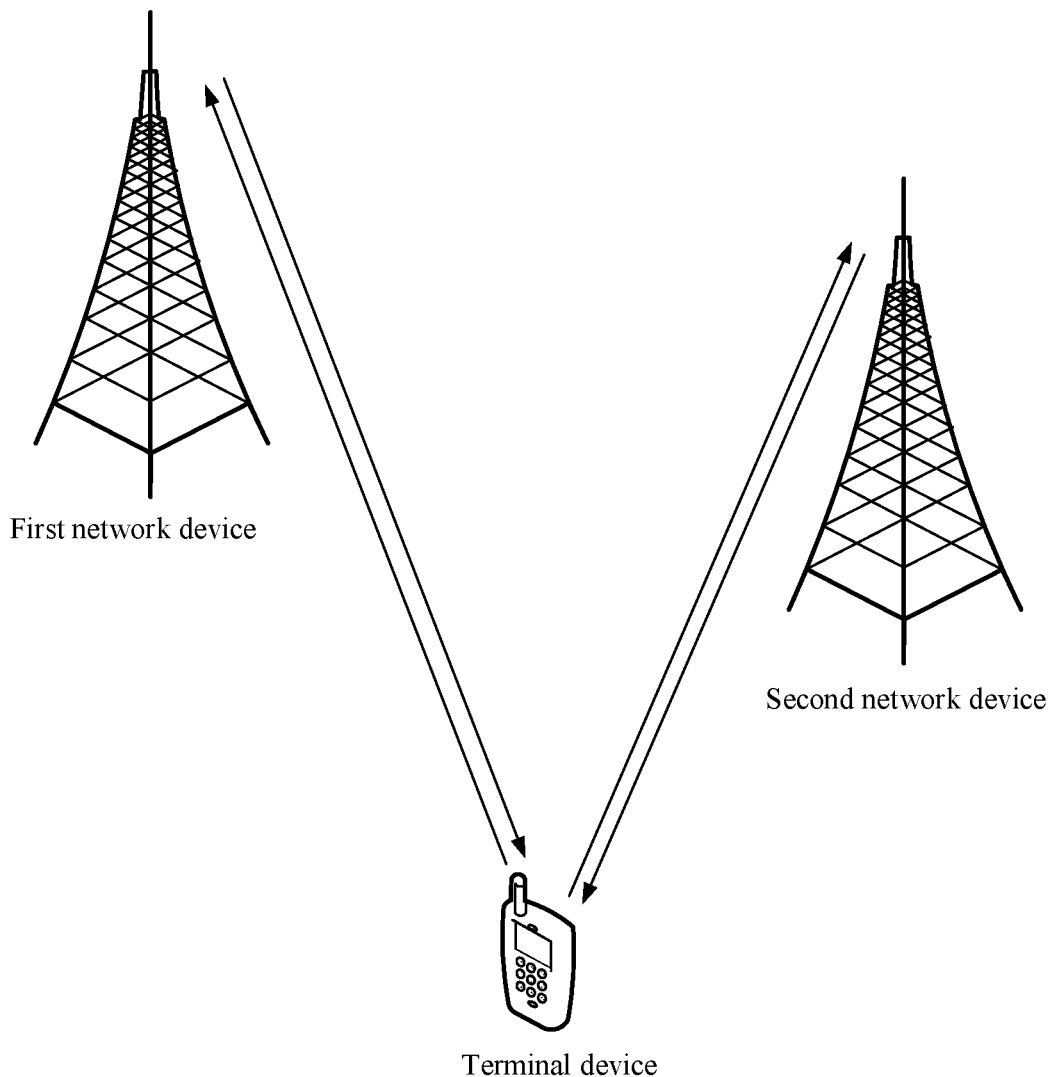
FIG. 3 is a schematic diagram of an application scenario according to an embodiment of this application.

FIG. 3 is a schematic diagram of an application scenario according to an embodiment of this application. In FIG. 3, two network devices and one terminal device are included. The two network devices are a network device 1 and a network device 2. The network device 1 is, for example, a master network device of the terminal device and the network device 2 is a secondary network device of the terminal device, or the network device 1 is a secondary network device of the terminal device and the network device 2 is a master network device of the terminal device. For example, if the two network devices are both base stations, the master network device is also a master gNB (master gNB), and the secondary network device is also a secondary gNB (secondary gNB). For example, the network device 1 works in an evolved universal mobile communications system terrestrial radio access (evolved UMTS terrestrial radio access, E-UTRA) system, and the network device 2 works in an NR system. Alternatively, the network device 1 works in an NR system, and the network device 2 works in an E-UTRA system. Alternatively, the network device 1 and the network device 2 both work in an NR system or an E-UTRA system. The terminal device is connected to the two network devices, and the terminal device can communicate with the two network devices. Certainly, in FIG. 3, that the terminal device is connected to two network devices is merely used as an example. In this embodiment of this application, the terminal device may be alternatively connected to three or more network devices. A quantity of network devices is not limited.

For example, the network device in FIG. 3 is a base station. The network device corresponds to different devices in different systems. For example, the network device may correspond to an eNB in a fourth generation mobile communications technology (the 4th generation, 4G) system, and correspond to a 5G network device, for example, a gNB, in a 5G system.

The following describes the technical solutions provided in the embodiments of this application with reference to the accompanying drawings.

Figure 4:
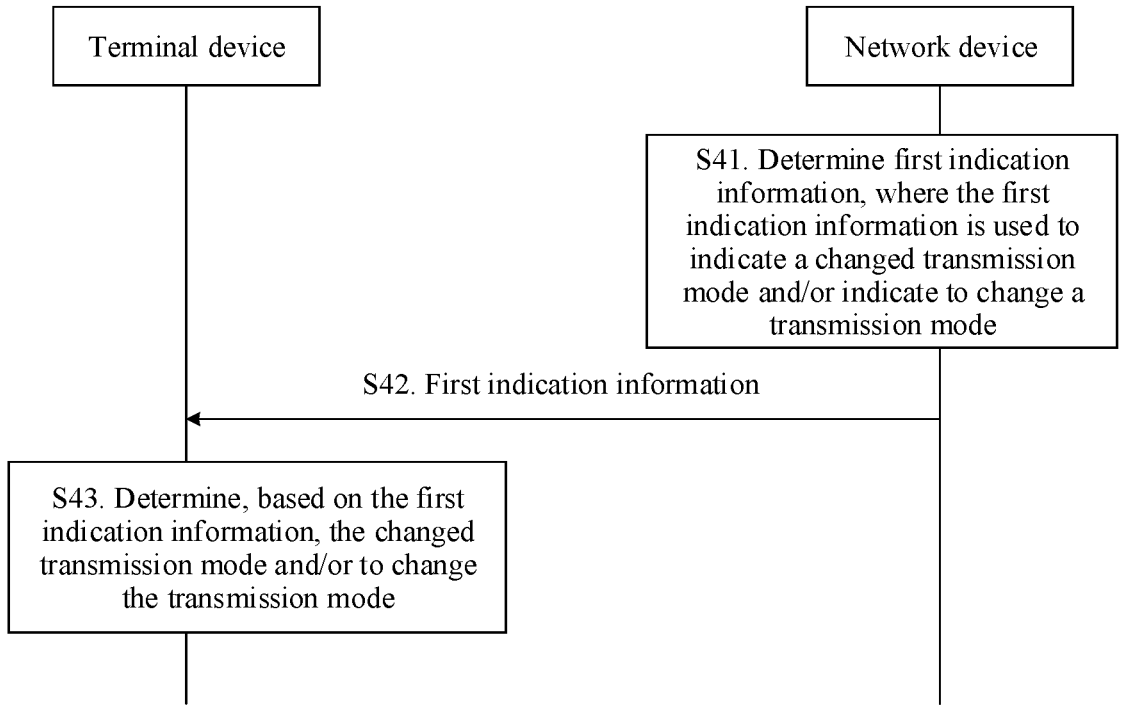
FIG. 4 is a flowchart of a transmission mode selection method according to an embodiment of this application.

An embodiment of this application provides a transmission mode selection method. FIG. 4 is a flowchart of the method. In the following description process, an example in which the method is applied in the network architecture shown in FIG. 3 is used. In addition, the method may be performed by two communications apparatuses. The two communications apparatuses are, for example, a first communications apparatus and a second communications apparatus. The first communications apparatus may be a network device or a communications apparatus that can support a network device in implementing a function required for the method, or the first communications apparatus may be a terminal device or a communications apparatus that can support a terminal device in implementing a function required for the method. Certainly, the first communications apparatus may alternatively be another communications apparatus, for example, a chip system. Similarly, the second communications apparatus may be a network device or a communications apparatus that can support a network device in implementing a function required for the method, or the second communications apparatus may be a terminal device or a communications apparatus that can support a terminal device in implementing a function required for the method. Certainly, the second communications apparatus may alternatively be another communications apparatus, for example, a chip system. In addition, implementations of the first communications apparatus and the second communications apparatus are not limited. For example, the first communications apparatus may be a network device, and the second communications apparatus is a terminal device; or both the first communications apparatus and the second communications apparatus are network devices; or both the first communications apparatus and the second communications apparatus are terminal devices; or the first communications apparatus is a network device, and the second communications apparatus is a communications apparatus that can support a terminal device in implementing a function required for the method. For example, the network device is a base station.

For ease of description, the following uses an example in which the method is performed by a network device and a terminal device, that is, an example in which the first communications apparatus is the network device and the second communications apparatus is the terminal device. If this embodiment is applied to the network architecture shown in FIG. 3, a network device, described below, configured to perform the embodiment shown in FIG. 4 may be the network device 1 in the network architecture shown in FIG. 3, a network device other than the network device described below may be the network device 2 in the network architecture shown in FIG. 3, and a terminal device described below may be the terminal device in the network architecture shown in FIG. 3.

S41. A network device determines first indication information, where the first indication information is used to indicate a changed transmission mode and/or indicate to change a transmission mode.

S42. The network device sends the first indication information to a terminal device, and the terminal device receives the first indication information from the network device.

S43. The terminal device determines, based on the first indication information, the changed transmission mode and/or to change the transmission mode.

In S41, that a network device determines first indication information may be, for example, generating the first indication information, or receiving the first indication information from another device. This is not specifically limited.

In S42, the network device may include the first indication information in a media access control control element (media access control control element, MAC CE), downlink control information (downlink control information, DCI), or radio resource control (radio resource control, RRC) signaling, and send the first indication information to the terminal device. This is not specifically limited.

The first indication information may be used to configure an initial transmission mode for a radio bearer. For example, when the radio bearer is configured, the transmission mode is indicated by using the first indication information, and the first indication information may be carried in signaling used to configure the radio bearer. In this case, the first indication information may indicate the transmission mode. For example, specific information about various transmission modes may be specified in a protocol, or may be configured by the network device for the terminal device. The first indication information may carry an identifier (for example, an identity (ID) or a sequence number) of a corresponding transmission mode. The terminal device may determine, by using the information that is about the transmission modes and that is in the protocol or configured by the network device, the transmission mode indicated by the first indication information. Alternatively, the first indication information may directly carry information about a corresponding transmission mode instead of an ID, and the terminal device can directly determine the corresponding transmission mode based on the first indication information. Because no transmission mode has been used for the radio bearer before, it may be considered that the first indication information indicates a changed transmission mode, and there is no transmission mode before the change.

Alternatively, the first indication information may be used to change a transmission mode of a radio bearer when the transmission mode is used for the radio bearer. In this case, indicating to "change" the current transmission mode may also be understood as indicating to switch a transmission mode. In this case, the radio bearer has been configured, and data is being transmitted in a specific transmission mode. The transmission mode may be changed by using the first indication information, to continue to transmit the data in another transmission mode. For example, specific information about various transmission modes may be specified in a protocol, or may be configured by the network device for the terminal device. The first indication information may carry an identifier (for example, an ID or a sequence number) of a corresponding transmission mode. The terminal device may determine, by using the information that is about the transmission modes and that is in the protocol or configured by the network device, the transmission mode indicated by the first indication information. Alternatively, the first indication information may directly carry information about a corresponding transmission mode instead of an ID, and the terminal device can directly determine the corresponding transmission mode based on the first indication information. After receiving the first indication information, the terminal device may match an ID of the transmission mode indicated by the first indication information with an ID of the current transmission mode of the radio bearer, or match information about the transmission mode indicated by the first indication information with the information about the current transmission mode of the radio bearer. If it is determined that the two IDs or the two pieces of information are inconsistent, the terminal device also clearly knows that the first indication information actually indicates a changed transmission mode, that is, implicitly indicates that the terminal device needs to change the transmission mode. Alternatively, the first indication information may only indicate to change the transmission mode, but does not indicate the changed transmission mode. For example, when there are a total of two transmission modes, this case is more applicable. One of the two transmission modes is currently used for the radio bearer, if the first indication information indicates that the transmission mode needs to be changed, it implicitly indicates that the transmission mode needs to be changed to the other one of the two transmission modes. For example, the first indication information needs to occupy only one bit (bit) to indicate to change the transmission mode, thereby helping reduce signaling overheads. Alternatively, the first indication information may not only indicate the changed transmission mode but also indicate to change the transmission mode. For example, the first indication information may indicate to switch the current transmission mode to another transmission mode, and specifically indicate what the another transmission mode is. This indication manner is clearer. Changing a transmission mode may also be referred to as activating a transmission mode and/or deactivating a transmission mode in different scenarios. An indication manner and a name of the first indication information are not limited in this embodiment of this application.

The terminal device may be connected to two or more network devices. The network device configured to perform the embodiment shown in FIG. 4 may be a master network device in the network devices connected to the terminal device, or may be a secondary network device in the network devices connected to the terminal device. In addition, if the terminal device is connected to a plurality of secondary network devices, the network device may be any one of the secondary network devices. In other words, there are a plurality of network devices connected to the terminal device, and one of the network devices may send the first indication information to the terminal device. For example, the network devices may interact with each other. After interaction between the plurality of network devices connected to the terminal device is completed, it is determined that the terminal device needs to enter a transmission mode. In this case, one of the network devices may send the first indication information to the terminal device. Alternatively, if there are two or more network devices connected to the terminal device, at least two of the network devices may send the first indication information to the terminal device. For example, the plurality of network devices connected to the terminal device may not interact with each other, and each of the network devices makes a decision separately. If at least two of the network devices may make a decision to enable the terminal device to enter a transmission mode, the terminal device may receive at least two pieces of first indication information. In this case, although the plurality of network devices does not interact with each other, decision results of the plurality of network devices may be the same. For example, at least two of the network devices both indicate the terminal device to enter a first mode. Therefore, although the terminal device receives a plurality of pieces of first indication information, confusion does not occur. Certainly, if the terminal device receives a plurality of pieces of first indication information, and transmission modes indicated by different first indication information are different, for example, a transmission mode indicated by one piece of first indication information is a first mode, and a transmission mode indicated by another piece of first indication information is a second mode, the terminal device may alternatively choose not to change the current transmission mode, or choose to use a transmission mode indicated by latest received indication information, or use indication information of a network device (for example, a master network device) that is specified in advance, to avoid confusion.

In this embodiment of this application, there may be a plurality of transmission modes, also referred to as transmission procedures, working modes, or the like, for transmitting a data packet that is of a radio bearer and that is duplicated at the PDCP layer. These are merely used to describe manners, steps, or procedures for transmitting the data packet that is duplicated at the PDCP layer, and these manners, steps, or procedures are not necessarily named, and may be distinguished only by different transmission procedures. This embodiment of this application provides a plurality of transmission modes. For ease of description, the transmission modes are named as a first mode, a second mode, and the like. A transmission mode can be selected or a transmission mode can be switched by using the first indication information. For example, when reliability of a mode for PDCP duplication is not high, another transmission mode can be selected by using the first indication information. In this way, a reliability requirement of a service is met as much as possible, thereby improving transmission quality of the service.

In this embodiment of this application, the transmission mode may include at least one or any combination of the following:

First mode: A data packet is duplicated at a PDCP layer to obtain N copies of data packets, and the N copies of data packets are transmitted via N network devices connected to the terminal device, where N is an integer greater than or equal to 2.

Second mode: A data packet is duplicated at a PDCP layer to obtain F copies of data packets, the F copies of data packets are transmitted via one network device connected to the terminal device, and the F copies of data packets are sent to the network device by using F logical channels of the terminal device, where F is an integer greater than or equal to 2.

Third mode: A data packet is duplicated at a PDCP layer to obtain F copies of data packets, the F copies of data packets are transmitted via one network device connected to the terminal device, and the F copies of data packets are sent to the network device by using F logical channels of the terminal device; and another data packet is duplicated at the PDCP layer to obtain K copies of data packets, the K copies of data packets are transmitted via another network device, and the K copies of data packets are sent to the another network device by using K logical channels of the terminal device, where both F and K are integers greater than or equal to 2.

Fourth mode: A data packet is duplicated at a PDCP layer to obtain M copies of data packets, the M copies of data packets are transmitted via H network devices connected to the terminal device, and each of the H network devices transmits at least one of the M copies of data packets, where both M and H are integers greater than or equal to 2, and H is less than M.

Fifth mode: A data packet is not duplicated at a PDCP layer, and the data packet is transmitted to a network device connected to the terminal device.

For example, when the first indication information indicates the changed transmission mode and indicates to change the transmission mode, in an indication manner, the first indication information indicates that a sixth mode is changed to a seventh mode, and the changed mode is the seventh mode. In this case, the sixth mode may be one of the foregoing five transmission modes, the seventh mode may also be one of the foregoing five transmission modes, and the sixth mode is different from the seventh mode. Alternatively, the sixth mode is one of the foregoing five transmission modes, and the seventh mode is another transmission mode that does not belong to the foregoing five transmission modes. Alternatively, the sixth mode is another transmission mode that does not belong to the foregoing five transmission modes, and the seventh mode is one of the foregoing five transmission modes. In other words, in this embodiment of this application, the transmission mode is relatively flexibly changed, and may be switched between the foregoing five transmission modes, or may be switched between any one of the foregoing five transmission modes and another possible transmission mode.

Alternatively, when the first indication information indicates the changed transmission mode and indicates to change the transmission mode, in another indication manner, the first indication information indicates to change the transmission mode, and indicates that the changed transmission mode is one of the first mode, the second mode, the third mode, the fourth mode, or the fifth mode. In this case, the transmission mode before the change (or the current transmission mode) may be one of the first mode, the second mode, the third mode, the fourth mode, or the fifth mode, or may be another transmission mode that does not belong to the five transmission modes.

The first mode may be understood as a multi-connectivity (multi-connectivity, MC) duplication mode, that is, a mode in which a data packet duplicated at the PDCP layer is transmitted by using at least two network devices connected to a radio bearer of the terminal device, and each network device transmits one data packet. A DC duplication mode is a special case of the MC duplication mode. The DC duplication mode is a mode in which a radio bearer of a terminal device is connected to two network devices, a data packet duplicated at a PDCP layer is transmitted by using the two network devices connected to the radio bearer of the terminal device, and each network device transmits one data packet. For example, the N network devices may be all network devices connected to the radio bearer of the terminal device, or may be some network devices connected to the radio bearer of the terminal device. For example, one radio bearer of the terminal device is connected to three network devices. If the transmission mode is the first mode, the terminal device may implement the first mode by using the three network devices. For example, the terminal device duplicates a to-be-transmitted data packet at the PDCP layer of the terminal device to obtain three copies, and sends the three copies to the three network devices, where each network device transmits one copy. Alternatively, the terminal device may implement the first mode by using two network devices in the three network devices. For example, the terminal device duplicates a to-be-transmitted data packet at the PDCP layer of the terminal device to obtain two copies, and sends the two copies to two network devices in the three network devices, where each network device transmits one copy. The remaining one network device in the three network devices is not used to transmit a data packet of the terminal device. When the first mode needs to be used for a radio bearer, network devices that are connected to the radio bearer of the terminal device and that are to be used by the terminal device to implement the first mode may be specified in a protocol, or may be indicated by the network device. For example, the network device performs configuration when configuring the radio bearer. For example, the network device sends second indication information to the terminal device, to configure the radio bearer. The second indication information may further indicate the N network devices configured to implement the first mode. After receiving the second indication information, the terminal device may determine the N network devices configured to implement the first mode, or determine that the changed transmission mode is the first mode. In this case, the network device may notify, by using the first indication information, the terminal device of network devices to which the terminal device transmits a data packet. This is not specifically limited.

In addition, in this case, the terminal device sends one data packet to each network device configured to implement the MC duplication mode. However, in this embodiment of this application, in a same network architecture, PDCP duplication can be implemented by one network device, or PDCP duplication can be implemented by a plurality of network devices. In this case, in one network device, a plurality of logical channels may be corresponding to one radio bearer (in other words, a plurality of RLC entities are corresponding to one radio bearer). For one radio bearer of the terminal device, a plurality of logical channels may be corresponding to one network device (or a plurality of RLC entities are corresponding to one network device). In this case, when sending a data packet to the network device, the terminal device may send the data packet by using a primary path (primary path) or a primary logical channel (or a primary leg) in the plurality of logical channels corresponding to the network device. For example, the network device sends the second indication information to the terminal device to configure a radio bearer. The second indication information may further indicate a primary logical channel or a primary RLC entity used when the terminal device transmits a data packet to each network device connected to the terminal device. Alternatively, the terminal device may perform sending by using any one of a plurality of logical channels (or may perform sending by using a primary RLC entity of a plurality of RLC entities, of the terminal device, corresponding to the network device, or may perform sending by using any one of a plurality of RLC entities). A logical channel (or RLC entity) used for transmission may be specified in a protocol. For example, it is specified that a primary logical channel or a primary RLC entity that is of the radio bearer of the terminal device and that is corresponding to each network device is used for transmission. Alternatively, if the network device configures, in the second indication information, a logical channel or an RLC entity corresponding to each network device connected to the terminal device, the terminal device may determine to use, for transmission, the logical channel or the RLC entity configured in the second indication information. The logical channel or the RLC entity configured by the network device for each network device by using the second indication information may be a primary logical channel or a primary RLC entity of each network device, or may be any other logical channel or an RLC entity. Alternatively, a logical channel (or RLC entity) may be indicated by the network device. For example, if the changed transmission mode is the first mode, the network device may notify, by using the first indication information, the terminal device of a logical channel or an RLC entity that is used to transmit a data packet and a network device to which the data packet is to be transmitted. In addition, when a data packet is sent by using one logical channel, the logical channel may be transmitted by using any available carrier of the terminal device. The first mode is relatively suitable for a case in which at least two network devices connected to the terminal device each have a carrier whose channel quality meets a requirement.

For example, the transmission mode indicated by the first indication information is the first mode. Alternatively, the transmission mode includes only the first mode and the second mode, and the current transmission mode is the second mode. That the first indication information indicates to change the current transmission mode means that the first indication information indicates to switch the transmission mode to the first mode, or the first indication information indicates to switch the transmission mode from the second mode to the first mode. In this case, the first indication information may further indicate the network device configured to implement the first mode. For example, one radio bearer of the terminal device is connected to all of the network device 1, the network device 2, and the network device 3, and the first indication information may indicate the network device 1 and the network device 2. This indicates that the first mode is implemented by using the two network devices.

Figure 5:
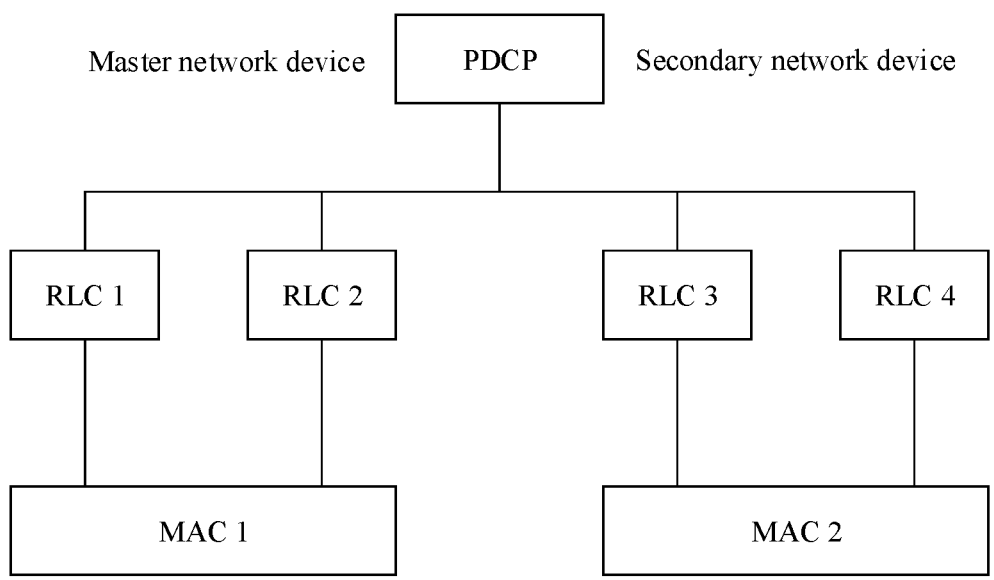
FIG. 5 is an architecture diagram of a terminal device according to an embodiment of this application.

FIG. 5 is an implementation architecture diagram of the terminal device. In FIG. 5, one radio bearer of the terminal device is connected to two network devices, where one is a master network device, and the other is a secondary network device. The terminal device may have different MAC layers corresponding to different network devices, and the terminal device separately sends data packets to the different network devices by using the different MAC layers. In FIG. 5, the radio bearer of the terminal device is connected to the two network devices. Therefore, a MAC layer that is of the radio bearer of the terminal device and that is corresponding to the master network device is MAC 1 in FIG. 5. If the terminal device sends a data packet to the master network device, the data packet is sent by using the MAC 1. A MAC layer corresponding to the secondary network device is MAC 2 in FIG. 5. If the terminal device sends a data packet to the secondary network device, the data packet is sent by using the MAC 2. The terminal device may duplicate the data packet at the PDCP layer of the terminal device to obtain two copies, and transmit the two copies by using the two network devices. Each copy is transmitted by using one network device. However, each of the two network devices may include a plurality of logical channels (or a plurality of RLC entities) corresponding to one radio bearer, and the terminal device separately includes a plurality of logical channels (or a plurality of RLC entities) corresponding to the radio bearer for the two network devices. Still referring to FIG. 5, the terminal device has two logical channels (or two RLC entities) corresponding to the master network device, which are shown as RLC 1 and RLC 2 in FIG. 5, and the terminal device has two logical channels (or two RLC entities) corresponding to the secondary network device, which are shown as RLC 3 and RLC 4 in FIG. 5. The RLC 1 is a primary path corresponding to the master network device, and the RLC 3 is a primary path corresponding to the secondary network device. In this case, the first indication information may further include an indication for a specific logical channel (or include an indication for a specific RLC entity). For example, the first indication information may further indicate to use a logical channel or an RLC entity corresponding to the RLC 1 to send a data packet to the master network device, and indicate to use a logical channel or an RLC entity corresponding to the RLC 3 to send a data packet to the secondary network device. Alternatively, the network device configured to implement the first mode may be specified in a protocol, and in this case, the first indication information may not be used for indication. Alternatively, a logical channel (or an RLC entity) configured to implement the first mode may be specified in a protocol, and the first indication information may not be used for indication. This manner can reduce overheads of the first indication information.

In addition, the current transmission mode is the first mode, for example, the terminal device transmits a data packet by using the N network devices connected to the radio bearer of the terminal device. The first indication information indicates to change the transmission mode, or the first indication information indicates to change to another transmission mode. In this case, the network device does not perform MC duplication in the changed transmission mode. The first indication information may further indicate to transmit a data packet to a third network device in the N network devices after the transmission mode changes. There may be one or more third network devices. Alternatively, if network devices connected to the radio bearer of the terminal device include another network device in addition to the N network devices, the first indication information may indicate to transmit a data packet to a third network device in the N network devices after the transmission mode changes, or may indicate to transmit a data packet to a fourth network device in P network devices after the transmission mode changes. The P network devices are network devices other than the N network devices in all network devices connected to the radio bearer of the terminal device. There may be one or more fourth network devices.

Alternatively, after an MC duplication mode of a radio bearer is deactivated, network devices used by the terminal device to transmit a data packet may be specified in a protocol, or indicated by a network device. For example, the network device performs indication by using the first indication information, or the network device performs configuration when configuring the radio bearer. For example, the network device configures the radio bearer by sending configuration signaling to the terminal device. The configuration signaling may carry the second indication information, and the second indication information may indicate to transmit the data packet to the third network device in the N network devices when the current transmission mode is not the first mode or when the current transmission mode is switched from the first mode to another mode. Alternatively, if the first mode needs to be changed to another mode, network devices to which the terminal device transmits a data packet may be determined by the terminal device. For example, the network device may indicate, by using the first indication information, to use a split transmission mode after the transmission mode changes. In this case, the terminal device may determine, by using a first data volume threshold, network devices to which a data packet is to be transmitted after the first mode is changed to another mode. If an amount of to-be-sent uplink data is greater than or equal to the first data volume threshold, the data packet may be transmitted to at least two network devices, that is, a relatively large quantity of network devices are used for transmission. If the amount of to-be-sent uplink data is less than or equal to the first data volume threshold, the data packet may be transmitted to one network device, that is, only one network device is used for transmission.

The second mode may be understood as a CA duplication mode for a single network device, that is, a mode in which a data packet duplicated at the PDCP layer is transmitted only by using one of network devices connected to a radio bearer of the terminal device. For example, one radio bearer of the terminal device is connected to a plurality of network devices. If the radio bearer is in the second mode, the terminal device may transmit, by using a master network device connected to the radio bearer of the terminal device, a data packet duplicated at the PDCP layer, or transmit, by using a secondary network device connected to the radio bearer of the terminal device, a data packet duplicated at the PDCP layer. If there are a plurality of secondary network devices, the data packet duplicated at the PDCP layer is transmitted by using one of the plurality of secondary network devices connected to the terminal device. A network device to which the terminal device transmits a data packet in the second mode may be specified in a protocol. For example, the protocol specifies that the terminal device fixedly transmits a data packet to a network device in the second mode. Alternatively, a network device to which the terminal device transmits a data packet in the second mode may be indicated by the network device. For example, the network device performs configuration when configuring a radio bearer. For example, the network device sends configuration signaling to the terminal device to configure the radio bearer. The configuration signaling may carry second indication information, and the second indication information may indicate a first network device in network devices connected to the terminal device. In this case, if the terminal device enters the second mode, the terminal device may transmit a data packet to the first network device. The first network device may be a master network device connected to the terminal device, or may be a secondary network device or another network device. Alternatively, the changed transmission mode is the second mode. In this case, the network device may notify, by using the first indication information, the terminal device of a network device to which the terminal device transmits a data packet. Alternatively, the terminal device may perform determining by itself. For example, the terminal device may determine, based on a network device that sends the first indication information, the network device from which the first indication information comes, and the terminal device determines to transmit a data packet to the network device. Alternatively, the terminal device may perform determining based on carrier quality of each network device connected to the radio bearer. For example, after receiving the first indication information, the terminal device may determine to transmit a data packet to a network device with best carrier quality. The terminal device may independently determine the carrier quality of the network device based on a data packet transmission success rate, or the network device may notify the terminal device of the carrier quality of the network device.

The second mode is relatively suitable for a case in which a network device connected to the radio bearer of the terminal device has a carrier whose channel quality meets a requirement.

In one network device, a plurality of logical channels may be corresponding to one radio bearer (in other words, a plurality of RLC entities are corresponding to one radio bearer). For the terminal device, a plurality of logical channels may be corresponding to one network device (in other words, a plurality of RLC entities are corresponding to one network device). For example, the second mode of the radio bearer is implemented by using one network device, and the radio bearer of the terminal device has F logical channels corresponding to the network device. In this case, the terminal device may duplicate a data packet of the radio bearer at the PDCP layer to obtain F copies of data packets, and send the F copies of data packets by using the F logical channels that are of the terminal device and that are corresponding to the network device, where each logical channel may be used to send one copy of data packet (in other words, a data packet duplicated at the PDCP layer is sent by using a plurality of RLC entities that are of the terminal device and that are corresponding to the network device, where each RLC entity is used to send one data packet). In the embodiments of this application, one copy of data packet is one data packet. In addition, logical channels or RLC entities used by the terminal device to transmit a data packet to the network device in the second mode may be specified in a protocol, or may be indicated by the network device. For example, the network device performs configuration when configuring a radio bearer. For example, the network device sends configuration signaling to the terminal device to configure the radio bearer. The configuration signaling may carry second indication information, and the second indication information may indicate a first network device in network devices connected to the terminal device. The first network device may be any one of the network devices connected to the terminal device. The second indication information is used to indicate a network device that is selected by the terminal device for communication in some modes, for example, when the transmission mode is changed to the second mode, indicate that the network device selected in the second mode is the first network device. The first network device may be a master network device connected to the terminal device, or may be a secondary network device or another network device. In addition, the second indication information may further indicate logical channels or RLC entities used by the terminal device to send a data packet to the master network device when the master network device performs CA duplication. Alternatively, the changed transmission mode is the second mode. In this case, the network device may notify, by using the first indication information, the terminal device of logical channels or RLC entities used to transmit a data packet to the network device.

For example, the transmission mode indicated by the first indication information is the second mode. Alternatively, the transmission mode includes only the third mode and the second mode, and the current transmission mode is the third mode. That the first indication information indicates to change the current transmission mode means that the first indication information indicates to switch the transmission mode to the second mode, or the first indication information indicates to switch the transmission mode from the third mode to the second mode. In this case, the first indication information may further be used to indicate the network device configured to implement the second mode. Still referring to FIG. 5, for example, the radio bearer of the terminal device is connected to one master network device and one secondary network device in total, and the first indication information may indicate the master network device, indicating that the second mode is implemented by using the master network device. For the master network device, the terminal device includes two logical channels (or two RLC entities) corresponding to the radio bearer, that is, two logical channels shown by RLC 1 and RLC 2 in FIG. 5. In this case, the terminal device may duplicate the data packet by using the PDCP layer of the terminal device to obtain two copies, and transmit the two copies by using the two logical channels of the master network device. Each copy of data packet is transmitted by using one logical channel.

In addition, if the current transmission mode is the second mode, for example, the terminal device transmits a data packet to one network device connected to the radio bearer of the terminal device. The first indication information indicates that the transmission mode is changed to another transmission mode, and the another transmission mode is not the second mode, or the network device no longer performs CA duplication in a changed transmission mode. In this case, after the transmission mode is changed to another transmission mode, if a data packet further needs to be transmitted to the network device, the first indication information may further indicate to transmit a data packet to the network device by using a second logical channel or a second RLC entity. In other words, after the transmission mode changes, the network device no longer performs CA duplication, but the terminal device still needs to transmit a data packet by using the network device. In this case, the terminal device transmits the data packet to the network device by using a logical channel or an RLC entity. In this case, the first indication information may indicate a corresponding logical channel or RLC entity, so that the terminal device implements transmission. Alternatively, after a CA duplication mode for a network device is deactivated, a logical channel or an RLC entity used by the terminal device to transmit a data packet to the network device may be specified in a protocol, or may be configured when a radio bearer is configured. For example, the network device sends, to the terminal device, configuration signaling used to configure the radio bearer, the configuration signaling carries the second indication information, and the second indication information is used to indicate a second logical channel or a second RLC entity. The terminal device transmits, by using the second logical channel or the second RLC entity, the data packet to the network device configured to implement the second mode. The second logical channel may be a primary logical channel or another logical channel that is in the terminal device and that is corresponding to the network device, or the second RLC entity may be a primary RLC entity or another RLC entity that is in the terminal device and that is corresponding to the network device.

The third mode may be understood as a CA duplication mode for a plurality of network devices, that is, a mode in which a data packet replicated at the PDCP layer is transmitted by using at least two network devices connected to a radio bearer of the terminal device. Different network devices transmit different data packets. In other words, different network devices separately perform CA duplication. The at least two network devices may be all network devices connected to the radio bearer of the terminal device, or may be some network devices connected to the radio bearer of the terminal device. For example, there are a plurality of network devices connected to the radio bearer of the terminal device. If the terminal device is in the third mode, the terminal device may duplicate a data packet at the PDCP layer to obtain F copies of data packets, and transmit the F copies of data packets by using one network device connected to the radio bearer of the terminal device. In addition, the terminal device may duplicate another data packet at the PDCP layer to obtain K copies of data packets, and transmit the K copies of data packets by using another network device connected to the radio bearer of the terminal device. By analogy, a plurality of data packets may be transmitted by using a plurality of network devices. The another network device herein is a network device, other than the network devices transmitting the N copies of data packets, connected to the radio bearer of the terminal device. Network devices configured to perform CA duplication may include a master network device of the terminal device, or include a secondary network device of the terminal device, or include a master network device and a secondary network device of the terminal device. Network devices to which the terminal device transmits a data packet in the third mode may be specified in a protocol, or may be indicated by the network device. For example, the network device performs configuration when configuring a radio bearer. For example, the network device performs indication by using second indication information carried in configuration signaling used to configure the radio bearer. Alternatively, for example, if the changed transmission mode is the third mode, the network device may notify, by using the first indication information, the terminal device of network devices to which the terminal device transmits a data packet.

In one network device, a plurality of logical channels may be corresponding to one radio bearer (in other words, a plurality of RLC entities are corresponding to one radio bearer). For the terminal device, a plurality of logical channels may be corresponding to one network device (in other words, a plurality of RLC entities are corresponding to one network device). In this case, when sending, to one network device, a data packet duplicated at the PDCP layer, the terminal device may send the data packet by using a plurality of logical channels that are of the terminal device and that are corresponding to the network device, where each logical channel may be used to send one data packet (in other words, a data packet duplicated at the PDCP layer is sent by using a plurality of RLC entities that are of the terminal device and that are corresponding to the network device, where each RLC entity is used to send one data packet). In addition, logical channels or RLC entities by using which the terminal device transmits a data packet to a corresponding network device in the third mode may be specified in a protocol, or may be indicated by the network device. For example, the network device performs configuration when configuring a radio bearer. For example, the network device performs indication by using second indication information carried in configuration signaling used to configure the radio bearer. Alternatively, for example, if the changed transmission mode is the third mode, the network device may notify, by using the first indication information, the terminal device of logical channels or RLC entities by using which the terminal device transmits a data packet to a corresponding network device.

For example, the transmission mode indicated by the first indication information is the third mode. Alternatively, the transmission mode includes only the third mode and the first mode, and the current transmission mode is the first mode. That the first indication information indicates to change the current transmission mode means that the first indication information indicates to switch the transmission mode to the third mode, or the first indication information indicates to switch the transmission mode from the first mode to the third mode. In this case, the first indication information may further indicate the network device configured to implement the third mode. Still referring to FIG. 5, for example, the radio bearer of the terminal device is connected to one master network device and one secondary network device in total, and the first indication information may indicate the master network device and the secondary network device, indicating that the third mode is implemented by using the master network device and the secondary network device. For the master network device, the terminal device includes two logical channels (or two RLC entities) corresponding to the radio bearer, that is, two logical channels shown by RLC 1 and RLC 2 in FIG. 5. For the secondary network device, the terminal device includes two logical channels (or two RLC entities) corresponding to the radio bearer, that is, two logical channels shown by RLC 3 and RLC 4 in FIG. 5. In this case, the terminal device may duplicate a data packet of the radio bearer by using the PDCP layer of the terminal device to obtain two copies, and transmit the two copies by using the two logical channels of the master network device; and duplicate another data packet of the radio bearer by using the PDCP layer of the terminal device to obtain two copies, and transmit the two copies by using the two logical channels of the secondary network device. Each copy of data packet is transmitted by using one logical channel. Certainly, if the radio bearer of the terminal device is connected to two network devices in total, in the third mode, network devices to which the terminal device transmits a data packet may not be specified in a protocol, and does not need to be indicated by the network device either. By default, the data packet may be transmitted to the two network devices connected to the radio bearer of the terminal device.

If the network device selects a working mode, the network device may select the working mode from the second mode and the third mode by using a data volume threshold. For example, the data volume threshold used by the network device for selection is a second data volume threshold. If the network device determines that an amount of to-be-sent uplink data is greater than or equal to the second data volume threshold, the third mode may be selected, and transmission is performed by using a relatively large quantity of network devices. If the network device determines that the amount of uplink data is less than or equal to the second data volume threshold, the second mode may be selected, and transmission is performed by using only one network device.

The fourth mode may be understood as a combination of an MC duplication mode and a CA duplication mode. In the fourth mode, the H network devices connected to the terminal device may perform MC duplication, and each of all or some of the H network devices may perform CA duplication. The H network devices may be all network devices connected to one radio bearer of the terminal device, or may be some network devices connected to the radio bearer of the terminal device, where H is greater than or equal to 2. The terminal device may duplicate a data packet to obtain M copies of data packets by using the PDCP layer. The M copies of data packets are transmitted by using the H network devices, each of the H network devices transmits at least one of the M copies of data packets, and the M copies of data packets are transmitted by using M logical channels (or M RLC entities). A value of M may be specified in a protocol, or indicated by the network device. For example, the network device may indicate the value of M by using the first indication information, or may configure the value of M when configuring the radio bearer. For example, the network device indicates the value of M by using second indication information carried in configuration signaling used to configure the radio bearer. Network devices configured to implement the fourth mode may include a secondary network device of the terminal device, or include a master network device and a secondary network device of the terminal device. Network devices to which the terminal device transmits a data packet in the fourth mode may be specified in a protocol, or may be indicated by the network device. For example, if the changed transmission mode is the fourth mode, the network device may notify, by using the first indication information, the terminal device of network devices to which the terminal device transmits a data packet. In the fourth mode, network devices that perform CA duplication may also be specified in a protocol, or may be indicated by the network device. For example, the network device performs configuration when configuring the radio bearer. Alternatively, for example, if the changed transmission mode is the fourth mode, the network device may notify, by using the first indication information, the terminal device of network devices that perform CA duplication.

In one network device, a plurality of logical channels may be corresponding to one radio bearer (in other words, a plurality of RLC entities are corresponding to one radio bearer). For the terminal device, a plurality of logical channels may be corresponding to one network device (in other words, a plurality of RLC entities are corresponding to one network device). In this case, if a network device is a network device that performs CA duplication in the fourth mode, when sending, to the network device, a data packet duplicated at the PDCP layer, the terminal device may send the data packet by using a plurality of logical channels that are of the terminal device and that are corresponding to the network device, where each logical channel may be used to send one data packet (in other words, a data packet duplicated at the PDCP layer is sent by using a plurality of RLC entities that are of the terminal device and that are corresponding to the network device, where each RLC entity is used to send one data packet). Alternatively, if a network device is a network device that does not perform CA duplication but participates in only DC duplication in the fourth mode, when sending a data packet to the network device, the terminal device may send the data packet by using a primary logical channel (or a primary leg) in a plurality of logical channels that are of the terminal device and that are corresponding to the network device, or may send the data packet by using any one of a plurality of logical channels (in other words, by using a primary RLC entity in a plurality of RLC entities that are of the terminal device and that are corresponding to the network device, or by using any one of a plurality of RLC entities). In the fourth mode, for a network device that does not perform CA duplication, a logical channel or an RLC entity used by the terminal device to send a data packet to the network device may be specified in a protocol, or may be indicated by the network device. For example, when the changed transmission mode is the fourth mode, the network device may indicate, by using the first indication information, the terminal device of a logical channel or an RLC entity used to send a data packet to the network device that does not perform CA duplication (in addition, the first indication information may further indicate network devices that perform CA duplication, or indicate network devices that do not perform CA duplication). Alternatively, the network device sends configuration signaling to the terminal device to configure the radio bearer, where the configuration signaling carries second indication information, and the second indication information may be used to indicate, to the terminal device, a first logical channel or a first RLC entity that is corresponding to each network device connected to the terminal device. In this case, for the network device that does not perform CA duplication, the terminal device may determine to send a data packet to the network device by using a first logical channel or a first RLC entity corresponding to the network device. For the network device, the first logical channel may be a primary logical channel or another logical channel that is of the terminal device and that is corresponding to the network device, or the first RLC entity may be a primary RLC entity or another RLC entity that is of the terminal device and that is corresponding to the network device. In addition, in the fourth mode, for the network device that performs CA duplication, logical channels or RLC entities used by the terminal device to transmit a data packet to the network device may be specified in a protocol, or may be indicated by the network device. For example, the network device performs configuration when configuring the radio bearer. For example, the network device configures, by using the second indication information, logical channels used by the terminal device to send a data packet to each network device connected to the terminal device when the network device performs CA duplication. Alternatively, the changed transmission mode is the fourth mode. In this case, the network device may notify, by using the first indication information, the terminal device of logical channels or RLC entities used to transmit a data packet to a corresponding network device.

For example, the transmission mode indicated by the first indication information is the fourth mode. Alternatively, the transmission mode includes only the fourth mode and the second mode, and the current transmission mode is the second mode. That the first indication information indicates to change the current transmission mode means that the first indication information indicates to switch the transmission mode to the fourth mode, or the first indication information indicates to switch the transmission mode from the second mode to the fourth mode. In this case, the first indication information may further indicate the network device configured to implement the fourth mode. For example, still referring to FIG. 5, the radio bearer of the terminal device is connected to one master network device and one secondary network device in total, and the first indication information may indicate the master network device and the secondary network device, indicating that the fourth mode is implemented by using the master network device and the secondary network device. Alternatively, if the radio bearer of the terminal device is connected to two network devices in total, there is no need to indicate (and no need to specify in a protocol) network devices used to implement the fourth mode, and the fourth mode may be implemented by default by using the two network devices connected to the terminal device. The first indication information may be further used to indicate network devices by using which CA duplication is performed. For example, the first indication information indicates that CA duplication is performed by using a master network device and a secondary network device. For the master network device, the terminal device includes two logical channels (or two RLC entities) corresponding to the radio bearer, that is, two logical channels shown by RLC 1 and RLC 2 in FIG. 5. For the secondary network device, the terminal device includes two logical channels (or two RLC entities) corresponding to the radio bearer, that is, two logical channels shown by RLC 3 and RLC 4 in FIG. 5. In this case, the terminal device may duplicate a data packet of the radio bearer by using the PDCP layer of the terminal device to obtain four copies, and transmit the four copies by using two logical channels of the master network device and two logical channels of the secondary network device. Each copy of data packet is transmitted by using one logical channel. If some of the network devices used to implement the fourth mode do not perform CA duplication, a logical channel or an RLC entity used by the terminal device to send a data packet to a network device that does not perform CA duplication may also be indicated by using the first indication information. For example, if the first indication information indicates to perform CA duplication by using the master network device, and indicates to transmit a data packet to the secondary network device by using the logical channel corresponding to the RLC 3, the terminal device may duplicate a data packet of the radio bearer to obtain three copies by using the PDCP layer of the terminal device, and transmit the three copies by using the two logical channels of the master network device and the logical channel corresponding to the RLC 3 of the secondary network device, where each copy of data packet is transmitted by using one logical channel.

In addition, a configuration method in the fourth mode may be: The network device sends PDCP configuration information for a radio bearer, where the configuration information includes an ID of the radio bearer. The network device sends configuration information of a plurality of RLC entities, where the configuration information of the RLC entities carries an ID of the radio bearer that is the same as that in the PDCP configuration information. In this way, after receiving the configuration information, the terminal device may associate the PDCP layer with different RLC entities by using the ID of the radio bearer, to form an architecture of duplication at the PDCP layer. To implement the fourth mode, the plurality of RLC entities are configured to communicate with at least two network devices, and at least two of the plurality of RLC entities are configured to communicate with a same network device. In other words, both a CA-based PDCP duplication function and an MC-based PDCP duplication function exist in this mode.

The fifth mode may be considered as a mode in which all duplication are deactivated. If the first indication information is used to indicate that the changed transmission mode is the fifth mode, or indicates to change the transmission mode (and implicitly indicates that the changed transmission mode is the fifth mode), the first indication information may be carried in signaling used to deactivate a radio bearer, or the first indication information may alternatively be carried in dedicated signaling. Alternatively, if the first indication information is used to indicate that the current transmission mode is the fifth mode (that is, indicates to switch the current transmission mode from the fifth mode to another transmission mode), or indicates to change the transmission mode, where the current transmission mode is the fifth mode, the first indication information may be carried in signaling used to activate the radio bearer, or the first indication information may be carried in dedicated signaling. The signaling used to activate the radio bearer may be specifically for activating an entire radio bearer, activating a logical channel, activating a CA duplication function of the network device, or the like. If the first indication information indicates that the fifth mode is changed to another mode, or the changed transmission mode indicated by the first indication information is not the fifth mode but the current mode is the fifth mode, if the mode is changed to the first mode, the first indication information may further indicate a logical channel or an RLC entity used by the terminal device to transmit a data packet to each network device that participates in implementation of the first mode. If the mode is changed to the second mode, the first indication information may further indicate a network device to which the terminal device transmits a data packet. In addition, logical channels or RLC entities used by the terminal device to transmit a data packet to the network device may be indicated. If the mode is changed to the third mode, the first indication information may further indicate network devices to which the terminal device transmits a data packet, and may further indicate logical channels or RLC entities used by the terminal device to transmit a data packet to the network devices. If the mode is changed to the fourth mode, the first indication information may further indicate network devices to which the terminal device transmits a data packet, indicate network devices that perform CA duplication, and indicate a logical channel or logical channels (or RLC entities) used by the terminal device to transmit a data packet to these network devices.

In the fifth mode, the terminal device does not need to duplicate a data packet at the PDCP layer, and only needs to normally transmit a data packet. The terminal device may transmit the data packet by using one network device connected to the terminal device, or may transmit the data packet by using a plurality of network devices connected to the terminal device. Network devices used for transmission may be specified in a protocol, or may be determined by the terminal device. For example, the network device indicates, by using the first indication information, to use the split transmission (split transmission) mode after the transmission mode changes (that the transmission mode changes is that the current transmission mode is changed to the fifth mode, but the current transmission mode is not limited). That is, the terminal device determines network devices used to transmit the data packet. Alternatively, the network device does not indicate, in the first indication information, a network device or network devices to which the terminal device transmits a data packet after the transmission mode changes. In this case, it may also be considered that the first indication information implicitly indicates that the terminal device uses the split transmission mode after the transmission mode changes. Alternatively, it is specified in the protocol that, provided that the network device does not indicate, in the first indication information, a network device or network devices to which the terminal device transmits a data packet after the transmission mode changes, the terminal device uses the split transmission mode after the transmission mode changes. Alternatively, network devices used for transmission may be indicated by the network device. For example, the network device performs configuration when configuring a radio bearer. For example, the network device sends configuration signaling to the terminal device to configure the radio bearer. The configuration signaling carries second indication information, and the second indication information may be used to indicate a first network device in network devices connected to the terminal device. If the terminal device enters the fifth mode, the terminal device may choose to send a data packet to the first network device. The first network device may be a master network device, a secondary network device, or another network device connected to the terminal device. Alternatively, the changed transmission mode is the fifth mode. In this case, the network device may indicate, by using the first indication information after the transmission mode changes, to transmit a data packet to a second network device connected to the terminal device, that is, notify the terminal device of network devices to which the data packet is to be sent. The second network device is a network device configured to implement the fifth mode, and may be one network device, or may be a plurality of network devices. Network devices configured to implement the fifth mode may include a master network device of the terminal device, or include a secondary network device of the terminal device, or include a master network device and a secondary network device of the terminal device. The split transmission mode is a mode in which the terminal device determines, based on a data volume threshold, to transmit a data packet to at least one network device connected to the radio bearer of the terminal device, and the data volume threshold is, for example, a first data volume threshold.

If the network device indicates, by using the first indication information, network devices used to implement the fifth mode, the network device may determine, by using a third data volume threshold, the network devices used to implement the fifth mode. If an amount of to-be-sent uplink data is greater than or equal to the third data volume threshold, at least two network devices may be selected to implement the fifth mode, that is, a relatively large quantity of network devices are selected for transmission. In this case, at least two second network devices are included. If the amount of to-be-sent uplink data is less than or equal to the third data volume threshold, one network device may be selected to implement the fifth mode, and only one network device is used for transmission. In this case, one second network device is included. The second data volume threshold and the third data volume threshold may be equal or may not be equal.

Alternatively, if the network device indicates, by using the first indication information, to use the split transmission mode after the transmission mode changes, the terminal device may determine, by using the first data volume threshold, the network device configured to implement the fifth mode. If an amount of to-be-sent uplink data is greater than or equal to the first data volume threshold, at least two network devices may be used to implement the fifth mode, that is, a relatively large quantity of network devices are used for transmission. If the amount of to-be-sent uplink data is less than or equal to the first data volume threshold, one network device may be used to implement the fifth mode, that is, only one network device is used for transmission. The first data volume threshold and the third data volume threshold may be equal or may not be equal.

For example, the transmission mode indicated by the first indication information is the fifth mode. Alternatively, the transmission mode includes only the third mode and the fifth mode, and the current transmission mode is the third mode. That the first indication information indicates to change the current transmission mode means that the first indication information indicates to switch the transmission mode to the fifth mode, or the first indication information indicates to switch the transmission mode from the third mode to the fifth mode. In this case, if the first indication information indicates to send a data packet to the second network device after the transmission mode changes, the first indication information or the second indication information may further indicate the second network device configured to implement the fifth mode. In addition, a logical channel or an RLC entity used by the terminal device to send a data packet to each second network device may be specified in a protocol, or may be indicated by the network device. For example, the network device performs configuration when configuring a radio bearer. For example, the network device sends configuration signaling to the terminal device to configure the radio bearer. The configuration signaling carries second indication information, and the second indication information may indicate a first logical channel or a first RLC entity corresponding to the second network device. The terminal device may transmit a data packet to the second network device in the fifth mode by using the first logical channel or the first RLC entity, where a quantity of first logical channels is the same as a quantity of second network devices (or a quantity of first RLC entities is the same as a quantity of second network devices). For example, the second indication information may indicate a primary logical channel or a primary RLC entity that is of the terminal device and that is corresponding to each network device connected to the terminal device, and the primary logical channel or the primary RLC entity includes the first logical channel or the first RLC entity corresponding to the second network device. Alternatively, the changed transmission mode is the fifth mode. In this case, the network device may indicate, by using the first indication information, the terminal device to transmit a data packet to the second network device by using the first logical channel or the first RLC entity. There may be one or more first logical channels, and the first logical channels are in a one-to-one correspondence with the second network devices, which is the same for the RLC entity.

Still referring to FIG. 5, for example, the radio bearer of the terminal device is connected to one master network device and one secondary network device in total, and the first indication information may indicate the master network device and the secondary network device, indicating that the fifth mode is implemented by using the master network device and the secondary network device. For the master network device, the terminal device includes two logical channels (or two RLC entities) corresponding to the radio bearer, that is, two logical channels shown by RLC 1 and RLC 2 in FIG. 5. For the secondary network device, the terminal device includes two logical channels (or two RLC entities) corresponding to the radio bearer, that is, two logical channels shown by RLC 3 and RLC 4 in FIG. 5, where the first indication information further indicates that a data packet is sent to the master network device by using the logical channel corresponding to the RLC 1 and a data packet is sent to the secondary network device by using the logical channel corresponding to the RLC 3. In this case, the terminal device may duplicate a data packet of the radio bearer by using the PDCP layer of the terminal device to obtain two copies, send the two copies to the master network device by using the logical channel corresponding to the RLC 1 and the logical channel corresponding to the RLC 3. Each copy of data packet is transmitted by using one logical channel.

Alternatively, if the first indication information indicates to use the split transmission mode after the transmission mode changes, the first indication information may further indicate the network device configured to implement the fifth mode. For example, the first indication information indicates a logical channel or an RLC entity used when the terminal device transmits a data packet to each network device connected to the terminal device. In this case, after determining the network device used to implement the fifth mode, the terminal device may determine a logical channel or an RLC entity used to send a data packet to the network device used to implement the fifth mode. Alternatively, if the first indication information indicates to use the split transmission mode after the transmission mode changes, and the network device indicates, in advance by using the second indication information carried in the configuration signaling, a logical channel or an RLC entity used when the terminal device transmits a data packet to each network device connected to the terminal device, the first indication information does not need to indicate the corresponding logical channel or RLC entity. After determining the network device configured to implement the fifth mode, the terminal device may determine, based on the second indication information, a logical channel or an RLC entity used to send a data packet to the network device configured to implement the fifth mode. If the network device indicates, by using the second indication information, the logical channel or the RLC entity used when the terminal device transmits the data packet to each network device connected to the terminal device, the logical channel or the RLC entity indicated by the second indication information is, for example, a primary logical channel or a primary RLC entity of each network device connected to the terminal device.

In this embodiment of this application, there may be a plurality of transmission modes for transmitting a data packet duplicated at a PDCP layer, in other words, there may be a plurality of modes for PDCP duplication. A transmission mode can be selected by using the first indication information. For example, when reliability of a mode for PDCP duplication is not high, another transmission mode can be selected by using the first indication information, that is, different transmission modes may be flexibly selected according to a situation. In this way, a reliability requirement of a service is met as much as possible, thereby improving transmission quality of the service.

The following describes, with reference to the accompanying drawings, apparatuses configured to implement the foregoing methods in the embodiments of this application. Therefore, all the foregoing content may be used in subsequent embodiments, and repeated content is not described again.

Figure 6:
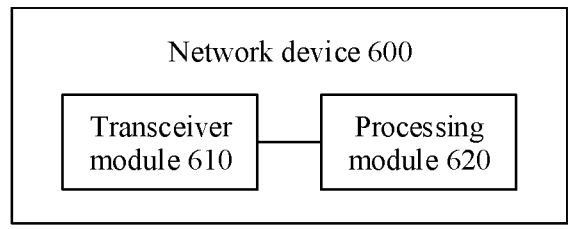
FIG. 6 is a schematic block diagram of a network device according to an embodiment of this application.

FIG. 6 is a schematic block diagram of a communications device 600 according to an embodiment of this application. The communications device 600 is, for example, a network device 600, and the network device 600 includes:

a processing module 620, configured to determine first indication information, where the first indication information is used to indicate a changed transmission mode and/or indicate to change a transmission mode; and a transceiver module 610, configured to send the first indication information to a terminal device, where the transmission mode includes one of a first mode, a second mode, a third mode, a fourth mode, or a fifth mode, where in the first mode, a data packet is duplicated at a PDCP layer to obtain N copies of data packets, and the N copies of data packets are transmitted via N network devices connected to the terminal device, where N is an integer greater than or equal to 2;

in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, where F is an integer greater than or equal to 2;

in the third mode, a data packet is duplicated at a PDCP layer to obtain F copies of data packets, the F copies of data packets are transmitted via one network device connected to the terminal device, and the F copies of data packets are sent to the network device by using F logical channels of the terminal device; and another data packet is duplicated at the PDCP layer to obtain K copies of data packets, the K copies of data packets are transmitted via another network device, and the K copies of data packets are sent to the another network device by using K logical channels of the terminal device, where both F and K are integers greater than or equal to 2;

in the fourth mode, a data packet is duplicated at a PDCP layer to obtain M copies of data packets, the M copies of data packets are transmitted via H network devices connected to the terminal device, and each of the H network devices transmits at least one of the M copies of data packets, where both M and H are integers greater than or equal to 2, and H is less than M; and in the fifth mode, a data packet is not duplicated at a PDCP layer, and the data packet is transmitted to a network device connected to the terminal device.

In an optional implementation, that the first indication information is used to indicate a changed transmission mode and indicate to change a transmission mode includes:

the first indication information is used to indicate to change a transmission mode, and indicate that a changed transmission mode is one of the first mode, the second mode, the third mode, the fourth mode, or the fifth mode.

In an optional implementation, when the changed transmission mode indicated by the first indication information is the second mode, the first indication information further indicates the network device; or the transceiver module 610 is further configured to send second indication information to the terminal device, where the second indication information is used to indicate a first network device in network devices connected to the terminal device, and the first network device is the network device.

In an optional implementation, when the changed transmission mode indicated by the first indication information is the fifth mode, the first indication information further indicates to transmit, after the transmission mode changes, a data packet to a second network device connected to the terminal device, or indicates to use a split transmission mode after the transmission mode changes; or the transceiver module 610 is further configured to send second indication information to the terminal device, where the second indication information is used to indicate a first network device in network devices connected to the terminal device, where the split transmission mode is a mode in which the terminal device determines, based on a first data volume threshold, to transmit a data packet to at least one network device connected to the terminal device.

In an optional implementation, when the first indication information indicates to transmit, after the transmission mode changes, the data packet to the second network device connected to the terminal device, the first indication information further indicates to transmit the data packet to the second network device by using a first logical channel or a first RLC entity; or the transceiver module 610 is further configured to send the second indication information to the terminal device, where the second indication information is used to indicate a first logical channel or a first RLC entity, and the terminal device transmits the data packet to the second network device by using the first logical channel or the first RLC entity.

In an optional implementation, when the first indication information indicates to use the split transmission mode after the transmission mode changes, the first indication information further indicates a logical channel or an RLC entity to be used by the terminal device when the terminal device transmits a data packet to each network device connected to the terminal device; or the transceiver module 610 is further configured to send second indication information to the terminal device, where the second indication information is used to indicate a logical channel or an RLC entity to be used by the terminal device when the terminal device transmits a data packet to each network device connected to the terminal device.

In an optional implementation, when the first indication information is used to indicate to change the current transmission mode, and the current transmission mode is the second mode, the first indication information is further used to indicate to transmit a data packet to the network device by using a second logical channel or a second RLC entity; or the transceiver module 610 is further configured to send second indication information to the terminal device, where the second indication information is used to indicate a second logical channel or a second RLC entity, and the terminal device transmits a data packet to the network device by using the second logical channel or the second RLC entity.

In an optional implementation, when the first indication information is used to indicate to change the current transmission mode, and the current transmission mode is the first mode, the first indication information is further used to indicate to transmit a data packet to a third network device in the N network devices after the transmission mode changes; or the transceiver module 610 is further configured to send second indication information to the terminal device, where the second indication information is used to indicate to transmit a data packet to a third network device in the N network devices when the current transmission mode is not the first mode.

It should be understood that the processing module 620 in this embodiment of this application may be implemented by a processor or a processor-related circuit component, and the transceiver module 610 may be implemented by a transceiver or a transceiver-related circuit component.

Figure 7:
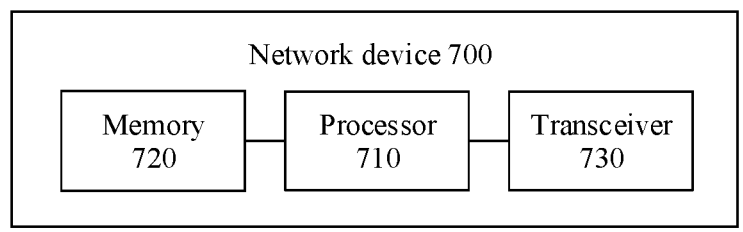
FIG. 7 is another schematic block diagram of a first network device according to an embodiment of this application.

As shown in FIG. 7, an embodiment of this application further provides a communications device 700. The communications device 700 is, for example, a network device 700. The network device 700 includes a processor 710, a memory 720, and a transceiver 730. The memory 720 stores an instruction or a program, and the processor 710 is configured to execute the instruction or the program stored in the memory 720. When the instruction or program stored in the memory 720 is executed, the processor 710 is configured to perform an operation performed by the processing module 620 in the foregoing embodiment, and the transceiver 730 is configured to perform an operation performed by the transceiver module 610 in the foregoing embodiment.

It should be understood that the network device 600 or the network device 700 according to the embodiments of this application may correspond to the network device in the embodiment shown in FIG. 4, and operations and/or functions of modules in the network device 600 or the network device 700 are separately used to implement corresponding procedures in the embodiment shown in FIG. 4. For brevity, details are not described herein again.

Figure 8:
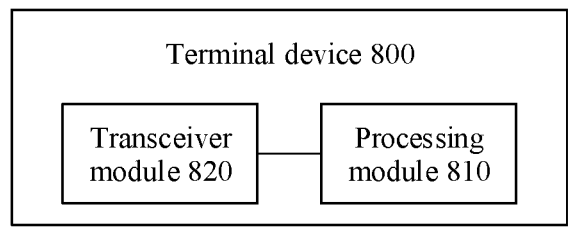
FIG. 8 is a schematic block diagram of a first terminal device according to an embodiment of this application.

FIG. 8 is a schematic block diagram of a communications device 800 according to an embodiment of this application. The communications device 800 is, for example, a terminal device 800. The terminal device 800 includes:

a transceiver module 820, configured to receive first indication information; and a processing module 810, configured to determine, based on the first indication information, a changed transmission mode and/or to change a transmission mode, where the transmission mode includes one of a first mode, a second mode, a third mode, a fourth mode, or a fifth mode, where in the first mode, a data packet is duplicated at a PDCP layer to obtain N copies of data packets, and the N copies of data packets are transmitted via N network devices connected to the terminal device, where N is an integer greater than or equal to 2;

in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, where F is an integer greater than or equal to 2;

in the third mode, a data packet is duplicated at a PDCP layer to obtain F copies of data packets, the F copies of data packets are transmitted via one network device connected to the terminal device, and the F copies of data packets are sent to the network device by using F logical channels of the terminal device; and another data packet is duplicated at the PDCP layer to obtain K copies of data packets, the K copies of data packets are transmitted via another network device, and the K copies of data packets are sent to the another network device by using K logical channels of the terminal device, where both F and K are integers greater than or equal to 2;

in the fourth mode, a data packet is duplicated at a PDCP layer to obtain M copies of data packets, the M copies of data packets are transmitted via H network devices connected to the terminal device, and each of the H network devices transmits at least one of the M copies of data packets, where both M and H are integers greater than or equal to 2, and H is less than M; and in the fifth mode, a data packet is not duplicated at a PDCP layer, and the data packet is transmitted to a network device connected to the terminal device.

In an optional implementation, the processing module 810 is configured to determine, based on the first indication information and in the following manner, a changed transmission mode and to change a transmission mode:

determining, based on the first indication information, to change a transmission mode, and determining that a changed transmission mode is one of the first mode, the second mode, the third mode, the fourth mode, or the fifth mode.

In an optional implementation, when the changed transmission mode indicated by the first indication information is the second mode, the processing module 810 is further configured to determine the network device based on the first indication information; or the transceiver module 820 is further configured to: receive second indication information, and determine, based on the second indication information, a first network device in network devices connected to the terminal device, where the first network device is the network device.

In an optional implementation, when the changed transmission mode indicated by the first indication information is the fifth mode, the processing module 810 is further configured to: determine, based on the first indication information, to transmit, after the transmission mode changes, a data packet to a second network device connected to the terminal device; or determine, based on the first indication information, to use a split transmission mode after the transmission mode changes; or the transceiver module 820 is further configured to: receive second indication information, and determine, based on the second indication information, a first network device in network devices connected to the terminal device, where the split transmission mode is a mode in which the terminal device determines, based on a first data volume threshold, to transmit a data packet to at least one network device connected to the terminal device.

In an optional implementation, the processing module 810 is further configured to determine whether an amount of to-be-transmitted data is less than a first data volume threshold after determining to use the split transmission mode after the transmission mode changes. When the processing module 810 determines that the amount of the to-be-transmitted data is less than the first data volume threshold, the transceiver module 820 is further configured to transmit a data packet to one network device; or when the processing module 810 determines that the amount of the to-be-transmitted data is greater than or equal to the first data volume threshold, the transceiver module 820 is further configured to transmit a data packet to a plurality of network devices.

In an optional implementation, when the processing module 810 determines, based on the first indication information, to transmit, after the transmission mode changes, the data packet to the second network device connected to the terminal device, the processing module 810 is further configured to: determine, based on the first indication information, to transmit the data packet to the second network device by using a first logical channel or a first radio link control RLC entity.

In an optional implementation, when the first indication information indicates to use the split transmission mode after the transmission mode changes, the processing module 810 is further configured to determine, based on the first indication information, a logical channel or an RLC entity to be used by the terminal device when the terminal device transmits a data packet to each network device connected to the terminal device; or the transceiver module 820 is further configured to: receive second indication information, and determine, based on the second indication information, a logical channel or an RLC entity to be used by the terminal device when the terminal device transmits a data packet to each network device connected to the terminal device.

In an optional implementation, when the processing module 810 determines, based on the first indication information, to change the current transmission mode, and the current transmission mode is the second mode, the processing module 810 is further configured to determine, based on the first indication information, to transmit a data packet to the network device by using a second logical channel or a second RLC entity; or the transceiver module 820 is further configured to: receive second indication information, determine a second logical channel or a second RLC entity based on the second indication information, and transmit, by the terminal device, a data packet to the network device by using the second logical channel or the second RLC entity.

In an optional implementation, when the processing module 810 determines, based on the first indication information, to change the current transmission mode, and the current transmission mode is the first mode, the processing module 810 is further configured to determine, based on the first indication information, to transmit a data packet to a third network device in the N network devices after the transmission mode changes; or the transceiver module 820 is further configured to: receive second indication information, and transmit a data packet to a third network device in the N network devices when determining, based on the second indication information, that the current transmission mode is not the first mode.

It should be understood that the processing module 810 in this embodiment of this application may be implemented by a processor or a processor-related circuit component, and the transceiver module 820 may be implemented by a transceiver or a transceiver-related circuit component.

Figure 9:
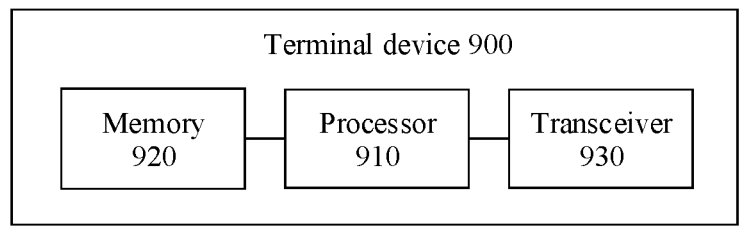
FIG. 9 is another schematic block diagram of a first terminal device according to an embodiment of this application.

As shown in FIG. 9, an embodiment of this application further provides a communications device 900. The communications device 900 is, for example, a terminal device 900. The terminal device 900 includes a processor 910, a memory 920, and a transceiver 930. The memory 920 stores an instruction or a program, and the processor 910 is configured to execute the instruction or the program stored in the memory 920. When the instruction or program stored in the memory 920 is executed, the processor 910 is configured to perform an operation performed by the processing module 810 in the foregoing embodiment, and the transceiver 930 is configured to perform an operation performed by the transceiver module 820 in the foregoing embodiment.

It should be understood that the network device 800 or the network device 900 according to the embodiments of this application may correspond to the network device in the embodiment shown in FIG. 4, and operations and/or functions of modules in the network device 800 or the network device 900 are separately used to implement corresponding procedures in the embodiment shown in FIG. 4. For brevity, details are not described herein again.

An embodiment of this application further provides a communications apparatus, and the communications apparatus may be a terminal device or a circuit. The communications apparatus may be configured to perform an action performed by the terminal device in the foregoing method embodiment shown in FIG. 4.

Figure 10:
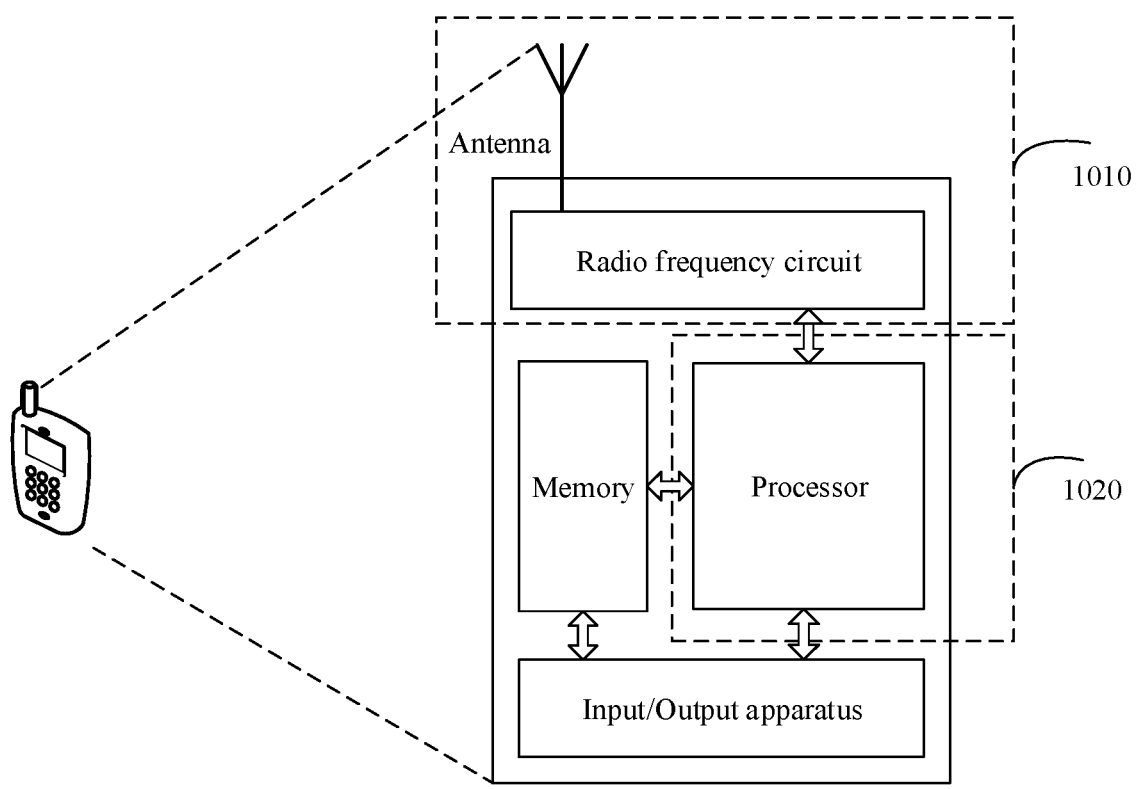
FIG. 10 is a schematic block diagram of a communications apparatus according to an embodiment of this application.

When the communications apparatus is a terminal device, FIG. 10 is a simplified schematic structural diagram of the terminal device. For ease of understanding and convenience of figure illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, or a keyboard, is mainly configured to receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 10, the terminal device includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 1010 may be considered as a receiving unit, and a component for implementing a sending function in the transceiver unit 1010 may be considered as a sending unit. In other words, the transceiver unit 1010 includes the receiving unit and the sending unit. The transceiver unit may also be sometimes referred to as a transceiver machine, a transceiver, a transceiver circuit, or the like. The receiving unit may also be sometimes referred to as a receiving machine, a receiver, a receiver circuit, or the like. The sending unit may also be sometimes referred to as a transmitting machine, a transmitter, a transmitter circuit, or the like.

It should be understood that the transceiver unit 1010 is configured to perform a sending operation and a receiving operation on a terminal device side in the foregoing method embodiment shown in FIG. 4, and the processing unit 1020 is configured to perform another operation excluding the receiving operation and the sending operation of the terminal device in the foregoing method embodiment shown in FIG. 4.

For example, in an implementation, the transceiver unit 1010 is configured to perform S42 in the embodiment shown in FIG. 4. The processing unit 1020 is configured to perform S43 in the embodiment shown in FIG. 4, and/or the processing unit 1020 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 11:
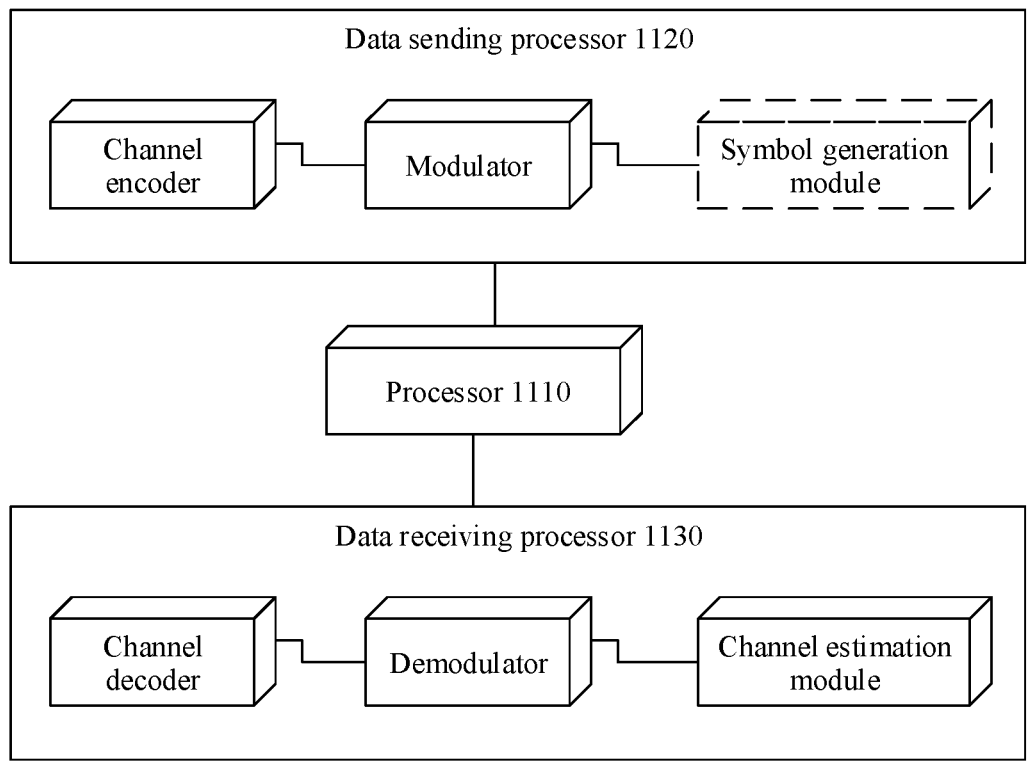
FIG. 11 is another schematic block diagram of a communications apparatus according to an embodiment of this application.

When the communications apparatus in this embodiment of this application is a terminal device, refer to a device shown in FIG. 11. In an example, the device may implement a function similar to that of the processor 910 in FIG. 9. In FIG. 11, the device includes a processor 1110, a data sending processor 1120, and a data receiving processor 1130. The processor 1110 in FIG. 11 may be the processing module 810 in the foregoing embodiment, and implements a corresponding function. The data sending processor 1120 and/or the data receiving processor 1130 in FIG. 11 may be the transceiver module 820 in the foregoing embodiment.

Although FIG. 11 shows a channel encoder and a channel decoder, it may be understood that the modules are merely examples, and do not constitute a limitation on this embodiment.

Figure 12:
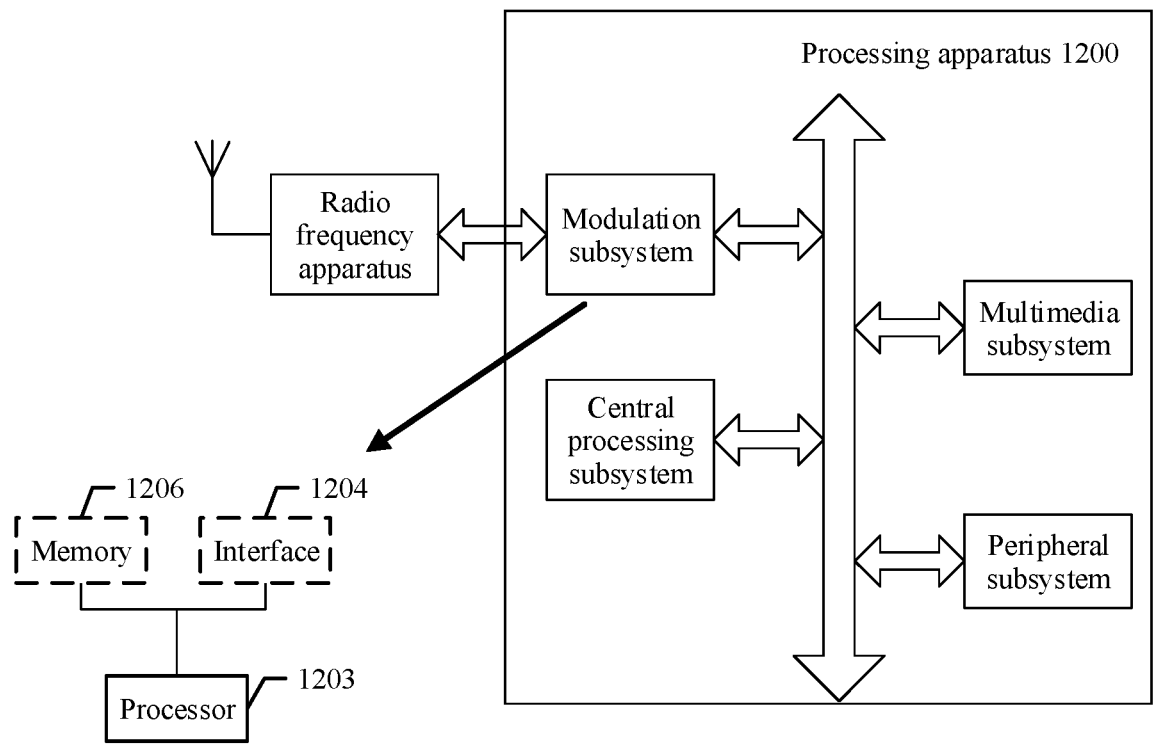
FIG. 12 is still another schematic block diagram of a communications apparatus according to an embodiment of this application.

FIG. 12 shows another form of this embodiment. A processing apparatus 1200 includes modules such as a modulation subsystem, a central processing subsystem, and a peripheral subsystem. The communications apparatus in the embodiments may be used as the modulation subsystem in the processing apparatus. Specifically, the modulation subsystem may include a processor 1203 and an interface 1204. The processor 1203 implements a function of the processing module 810, and the interface 1204 implements a function of the transceiver module 820. In another variation, the modulation subsystem includes a memory 1206, a processor 1203, and a program that is stored in the memory 1206 and that can be run on the processor. When executing the program, the processor 1203 implements the method on a terminal device side in the foregoing method embodiment shown in FIG. 4. It should be noted that the memory 1206 may be non-volatile or volatile. The memory 1206 may be located in the modulation subsystem, or may be located in the processing apparatus 1200, as long as the memory 1206 can be connected to the processor 1203.

An embodiment of this application further provides a computer-readable storage medium. The computer-readable storage medium stores a computer program. When the program is executed by a processor, a procedure related to the network device in the embodiment shown in FIG. 4 provided in the foregoing method embodiments may be implemented.

An embodiment of this application further provides a computer-readable storage medium. The computer-readable storage medium stores a computer program. When the program is executed by a processor, a procedure related to the terminal device in the embodiment shown in FIG. 4 provided in the foregoing method embodiments may be implemented.

An embodiment of this application further provides a computer program product including an instruction. When the instruction is executed, the method on a terminal device side in the method embodiment shown in FIG. 4 is performed.

An embodiment of this application further provides a computer program product including an instruction. When the instruction is executed, the method on a network device side in the method embodiment shown in FIG. 4 is performed.

It should be understood that, the processor mentioned in the embodiments of this application may be a central processing unit (central processing unit, CPU), and may further be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. According to description that is used as an example instead of a limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that units, algorithms, and steps in the examples described with reference to the embodiments disclosed in this application can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A transmission mode selection method, comprising:
   determining, by a device, first indication information, wherein the first indication information is used to indicate a change from transmission mode A to transmission mode B; and
   sending, by the device, the first indication information to a terminal device, wherein the transmission mode A is one of a first mode, a second mode, a fourth mode, or a fifth mode, and the transmission mode B is one of the first mode, the second mode, the fourth mode, or the fifth mode, and the transmission mode A is different from the transmission mode B, wherein
   in the first mode, a data packet is duplicated at a packet data convergence protocol (PDCP) layer to obtain N copies of data packets, and the N copies of data packets are transmitted via N network devices connected to the terminal device, wherein N is an integer greater than or equal to 2;
   in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, wherein F is an integer greater than or equal to 2;

in the fourth mode, a data packet is duplicated at a PDCP layer to obtain M copies of data packets, the M copies of data packets are transmitted via H network devices connected to the terminal device, and each of the H network devices transmits at least one of the M copies of data packets, wherein both M and H are integers greater than or equal to 2, and H is less than M;

in the fifth mode, a data packet is not duplicated at a PDCP layer, and the data packet is transmitted to a network device connected to the terminal device; and when the changed transmission mode indicated by the first indication information is the fifth mode, the terminal device is indicated to use a split transmission mode after the transmission mode changes, wherein the split transmission mode is a mode in which the terminal device determines, based on a first data volume threshold, to transmit data packets to a network device.

2. The method according to claim 1, wherein that the first indication information is used to indicate a changed transmission mode and indicate to change a transmission mode comprises:
the first indication information is used to indicate to change a transmission mode, and indicate that a changed transmission mode is one of the first mode, the second mode, the fourth mode, or the fifth mode.

3. The method according to claim 1, wherein
when the changed transmission mode indicated by the first indication information is the second mode, the first indication information further indicates the network device; and
the method further comprises: sending second indication information to the terminal device, wherein the second indication information is used to indicate a first network device in network devices connected to the terminal device, and the first network device is the network device.

4. The method according to claim 1, wherein
when the first indication information indicates to transmit, after the transmission mode changes, the data packet to a second network device connected to the terminal device, the first indication information further indicates to transmit the data packet to the second network device by using a first logical channel or a first radio link control (RLC) entity; and
when the first indication information does not indicate to transmit the method further comprises: sending second indication information to the terminal device, wherein the second indication information is used to indicate a first logical channel or a first RLC entity, and the terminal device transmits the data packet to the second network device by using the first logical channel or the first RLC entity.

5. The method according to claim 1, wherein
when the first indication information is used to indicate to change the current transmission mode, and the current transmission mode is the second mode, the first indication information is further used to indicate to transmit a data packet to the network device by using a second logical channel or a second radio link control (RLC) entity; and
when the first indication information is not used to indicate to change the current transmission mode, the method further comprises: sending second indication information to the terminal device, wherein the second indication information is used to indicate the second logical channel or the second RLC entity, and the terminal device transmits a data packet to the network device by using the second logical channel or the second RLC entity.

6. A transmission mode selection method, comprising:
receiving, by a device, first indication information; and
determining, by the device based on the first indication information, a change from transmission mode A to transmission mode B, wherein the transmission mode A is one of a first mode, a second mode, a fourth mode, or a fifth mode, and the transmission mode B is one of the first mode, the second mode, the fourth mode, or the fifth mode, and the transmission mode A is different from the transmission mode B, wherein in the first mode, a data packet is duplicated at a packet data convergence protocol (PDCP) layer to obtain N copies of data packets, and the N copies of data packets are transmitted via N network devices connected to a terminal device, wherein N is an integer greater than or equal to 2;

in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, wherein F is an integer greater than or equal to 2;

in the fourth mode, a data packet is duplicated at a PDCP layer to obtain M copies of data packets, the M copies of data packets are transmitted via H network devices connected to the terminal device, and each of the H network devices transmits at least one of the M copies of data packets, wherein both M and H are integers greater than or equal to 2, and H is less than M;

in the fifth mode, a data packet is not duplicated at a PDCP layer, and the data packet is transmitted to a network device connected to the terminal device; and when the changed transmission mode indicated by the first indication information is the fifth mode, determining, by the device, to use a split transmission mode after the transmission mode changes, wherein the split transmission mode is a mode in which the terminal device determines, based on a first data volume threshold, to transmit data packets to a network device.

7. The method according to claim 6, wherein the determining, based on the first indication information, a changed transmission mode and to change a transmission mode comprises:
determining, by the device based on the first indication information, to change a transmission mode, and determining that a changed transmission mode is one of the first mode, the second mode, the fourth mode, or the fifth mode.

8. The method according to claim 7, wherein
when the changed transmission mode indicated by the first indication information is the second mode, the method further comprises: determining the network device based on the first indication information; and
when the changed transmission mode indicated by the first indication information is not the second mode the method further comprises: receiving second indication information, and determining, based on the second indication information, a first network device in network devices connected to the terminal device, wherein the first network device is the network device.

9. The method according to claim 6, wherein after the determining to use a split transmission mode after the transmission mode changes, the method further comprises:
determining whether an amount of to-be-transmitted data is less than a first data volume threshold; and
transmitting a data packet to one network device when the amount of the to-be-transmitted data is less than the first data volume threshold, or transmitting a data packet to a plurality of network devices when the amount of the to-be-transmitted data is greater than or equal to the first data volume threshold.

10. The method according to claim 6, comprising:
when it is determined, based on the first indication information, to transmit, after the transmission mode changes, the data packet to the second network device connected to the terminal device, the method further comprises: determining, based on the first indication information, to transmit the data packet to the second network device by using a first logical channel and/or a first radio link control (RLC) entity; and
when it is determined, based on the first indication information, not to transmit, after the transmission mode changes the method further comprises: receiving the second indication information, determining the first logical channel or the first RLC entity based on the second indication information, and transmitting the data packet to the second network device by using the first logical channel or the first RLC entity.

11. A device, comprising:
a non-transitory memory storing executable instructions; and
a processer configured to execute the executable instructions to perform operations comprising:
receiving first indication information; and
determining, based on the first indication information, a change from transmission mode A to transmission mode B, wherein the transmission mode A is one of a first mode, a second mode, a fourth mode, or a fifth mode, and the transmission mode B is one of the first mode, the second mode, the fourth mode, or the fifth mode, and the transmission mode A is different from the transmission mode B, wherein
in the first mode, a data packet is duplicated at a packet data convergence protocol (PDCP) layer to obtain N copies of data packets, and the N copies of data packets are transmitted via N network devices connected to a terminal device, wherein N is an integer greater than or equal to 2;
in the second mode, a data packet is duplicated at a PDCP layer to obtain F copies of data packets, the F copies of data packets are transmitted via one network device connected to the terminal device, and the F copies of data packets are sent to the network device by using F logical channels of the terminal device, wherein F is an integer greater than or equal to 2;
in the fourth mode, a data packet is duplicated at a PDCP layer to obtain M copies of data packets, the M copies of data packets are transmitted via H network devices connected to the terminal device, and each of the H network devices transmits at least one of the M copies of data packets, wherein both M and H are integers greater than or equal to 2, and H is less than M;
in the fifth mode, a data packet is not duplicated at a PDCP layer, and the data packet is transmitted to a network device connected to the terminal device; and
when the changed transmission mode indicated by the first indication information is the fifth mode, determining to use a split transmission mode after the transmission mode changes, wherein the split transmission mode is a mode in which the terminal device determines, based on a first data volume threshold, to transmit data packets to a network device.

12. The device according to claim 11, wherein the operations of determining the change from the transmission mode A to the transmission mode B comprises:
determining, based on the first indication information, to change a transmission mode, and determining that a changed transmission mode is one of the first mode, the second mode, the fourth mode, or the fifth mode.

13. The device according to claim 11, wherein
when the changed transmission mode indicated by the first indication information is the second mode, the operations further comprises: determining the network device based on the first indication information; and
when the changed transmission mode indicated by the first indication information is not the second mode, the operations further comprise: receiving second indication information, and determining, based on the second indication information, a first network device in network devices connected to the terminal device, wherein the first network device is the network device.

14. The device according to claim 13, wherein after the determining to use a split transmission mode after the transmission mode changes, the operations further comprises:
determining whether an amount of to-be-transmitted data is less than a first data volume threshold; and
transmitting a data packet to one network device when the amount of the to-be-transmitted data is less than the first data volume threshold, or transmitting a data packet to a plurality of network devices when the amount of the to-be-transmitted data is greater than or equal to the first data volume threshold.

15. The device according to claim 13, comprising:
when it is determined, based on the first indication information, to transmit, after the transmission mode changes, the data packet to the second network device connected to the terminal device, the operations further comprise: determining, based on the first indication information, to transmit the data packet to the second network device by using a first logical channel and/or a first radio link control (RLC) entity; and
when it is determined, based on the first indication information, not to transmit, after the transmission mode changes, the operations further comprises: receiving the second indication information, determining a first logical channel or a first RLC entity based on the second indication information, and transmitting the data packet to the second network device by using the first logical channel or the first RLC entity.

16. The device according to claim 11, wherein
when it is determined, based on the first indication information, to change the current transmission mode, and the current transmission mode is the second mode, the operations further comprises: determining, based on the first indication information, to transmit a data packet to the network device by using a second logical channel or a second radio link control (RLC) entity; and
when it is determined, based on the first indication information, not to change the current transmission mode the operations further comprises: receiving second indication information, determining the second logical channel or the second RLC entity based on the second indication information, and transmitting, by the terminal device, a data packet to the network device by using the second logical channel or the second RLC entity.

17. The device according to claim 11, wherein when it is determined, based on the first indication information, to change the current transmission mode, and the current transmission mode is the first mode, the operations further comprises: determining, based on the first indication information, to transmit a data packet to a third network device in the N network devices after the transmission mode changes.

\* \* \* \* \*